United States Patent [19]

Locke, Jr. et al.

[11] 4,400,783
[45] Aug. 23, 1983

[54] EVENT-LOGGING SYSTEM

[75] Inventors: Philip F. Locke, Jr., Trafford, Pa.; Albert H. Maxwell, Jr., Raleigh, N.C.

[73] Assignee: Westinghouse Electric Corp., Pittsburgh, Pa.

[21] Appl. No.: 184,458

[22] Filed: Sep. 5, 1980

[51] Int. Cl.³ .................. G11C 11/00; G06F 15/20
[52] U.S. Cl. .................. 364/483; 364/550; 364/900; 324/113
[58] Field of Search .......... 364/483, 550, 900, 200; 340/173 AS; 324/113

[56] References Cited

U.S. PATENT DOCUMENTS

| | | | |
|---|---|---|---|
| 3,059,239 | 10/1962 | Snyder | 346/74 |
| 3,148,329 | 9/1964 | Lenehan | 324/113 |
| 3,189,821 | 1/1965 | Petzinger | 324/103 |
| 3,470,470 | 9/1969 | Snyder | 324/141 |
| 3,678,484 | 7/1972 | Maxwell, Jr. | 340/174.1 H |
| 3,702,464 | 11/1972 | Castrucci | 340/173 SP |
| 3,740,724 | 6/1973 | Snyder | 364/900 |
| 3,913,129 | 10/1975 | Snyder et al. | 324/113 X |
| 3,921,207 | 11/1975 | Doby | 324/113 X |
| 3,944,796 | 3/1976 | Fitzpatrick | 364/550 |
| 3,998,093 | 12/1976 | Bertolasi | 73/112 X |
| 4,080,568 | 3/1978 | Funk | 364/483 X |
| 4,115,870 | 9/1978 | Lowell | 364/900 |
| 4,162,530 | 7/1979 | Kusui et al. | 364/483 X |
| 4,250,552 | 2/1981 | Elms | 364/483 |
| 4,283,772 | 8/1981 | Johnston | 364/900 |
| 4,291,375 | 9/1981 | Wolf | 364/483 |
| 4,291,376 | 9/1981 | McCahill | 364/483 |
| 4,301,508 | 11/1981 | Anderson et al. | 364/492 X |
| 4,335,447 | 6/1982 | Jerrim | 364/900 |

Primary Examiner—Edward J. Wise
Attorney, Agent, or Firm—Robert E. Converse, Jr.

[57] ABSTRACT

A solid-state event-logging system records the occurrence of specified events in a removable, solid-state, memory cartridge. Counters continuously count pulses produced by a plurality of electrical energy measuring devices. Sample values of the continuous counts are produced and input to a microprocessor wherein each sample value has the previous sample value subtracted therefrom. The difference is added to an interval sum stored in a random access memory. The interval sums, together with real time information produced by a clock, are input to the memory cartridge according to a predetermined format. The clock is maintained in synchronization with the frequency of the line voltage by the microprocessor.

52 Claims, 16 Drawing Figures

EVENT-LOGGING SYSTEM

BACKGROUND OF THE INVENTION

1. Field of the Invention

This invention is related to systems capable of recording the occurrence of specified events and more particularly to metering telemetry systems for recording meter data, time data, power outage information, and the like.

2. Description of the Prior Art

Electric utilities have in recent years greatly increased their use of recording devices. The recording of various data from metering devices stems from the need to have accurate information about the electric utilities' power distribution network. This data, which typically includes at least real time information, energy consumption and power outages, is used for a variety of purposes. These purposes may include load surveys, billing of customers, establishing the needs of customers or for justifying rate schedules. Recording devices fulfilling the utilities' needs for this information have to date typically been of the magnetic tape variety.

The recording of utility metering data for extended periods of time, typically on the order of a month, utilizing magnetic tape recording devices is well known. U.S. Pat. No. 3,059,239 issued to C. J. Snyder on Oct. 16, 1962; U.S. Pat. No. 3,148,329 issued to B. E. Lenehan on Sept. 8, 1964; U.S. Pat. No. 3,189,821 issued to A. J. Petzinger on June 15, 1965; and U.S. Pat. No. 3,470,470 issued to C. J. Snyder on Sept. 30, 1969 are examples of magnetic recording devices. Translation of the recorded data is provided by a translator. Examples of such a translator include U.S. Pat. No. 3,678,484 issued to A. H. Maxwell, Jr. on July 18, 1972 and U.S. Pat. No. 3,740,724 issued to C. J. Snyder on May 14, 1971.

While magnetic tape recording devices enjoy almost exclusive use for utility recording needs it nevertheless remains desirable to develop a solid-state recording device. A solid-state recording device has no moving parts. There are, therefore, no mechanical failures due to worn out parts. Also, it is easier and cheaper to provide a battery backup for a solid-state device. Additionally, a solid-state memory may automatically be encoded with information regarding meter readings and customer identification thereby eliminating human errors during collection of the data cartridges. Lastly, in a completely automated system wherein the recordings are remotely read over a phone link or the like, the solid-state recordings may be easily read and erased without the need for sending an employee in the field to retrieve the data cartridges. The present invention is for a solid-state event-logging device having these and other advantages.

SUMMARY OF THE INVENTION

The present invention is for a solid-state event-logging system capable of recording digital data from a plurality of electrical energy measuring devices. The heart of the present invention is a control circuit comprised of a microprocessor, a read only memory (hereinafter ROM) and a random access memory (hereinafter RAM). The microprocessor produces a plurality of control signals which regulate the operation of the system. The ROM contains preprogrammed information, including instructions for the microprocessor, while the RAM provides memory locations for information which the microprocessor is programmed to store.

The present invention also includes input counters for continuously counting the pulses of the digital data. The counters produce a running count representative of the data. A sampling circuit produces sample values of the running count in response to the control signals. Each sample value is input to the microprocessor wherein the previous sample value, which is stored in the RAM, is subtracted therefrom. The difference is stored in the RAM as an interval sum. In this manner the counters never have to be reset which is considered to be an important feature of the present invention.

The present invention also includes a clock producing real time information. The clock is periodically interrogated by the microprocessor and the real time information is input to and stored in the RAM.

An input/output circuit is the interface between the control circuit and a solid-state removable memory. The input/output circuit is composed of a plurality of input/output ports and latches. The solid-state removable memory may be any of a variety of suitable memory technologies. The input/output circuit receives a stream of data from the RAM in response to control signals from the microprocessor. The stream of data includes the real time information, at least a portion of the preprogrammed information and the interval sum for each electrical energy measuring device. The stream of data is written in the removable memory means according to a predetermined format. Once the stream of data is successfully written in the removable memory the interval sums are reset to zero.

The present invention also includes a decoding circuit to aid the microprocessor in addressing the necessary components and to aid in preparing the addressed component to receive or transmit data.

A divider is used to produce an interrupt signal composed of pulses responsive to a sixty Hertz line voltage. The interrupt signal is used to both produce an interrogation signal for interrogating the clock circuit and for keeping the clock circuit in synchronization with the line voltage. The synchronization of the clock with the line voltage is considered to be an important feature of the present invention.

A power failure latch and a transmission gate are used to isolate the RAM from the microprocessor in the event of a power failure. This is considered to be an important feature of the present invention.

The present invention also includes a power-up reset circuit for resetting the microprocessor upon initial start-up. The power-up reset circuit is sensitive to the leading edge of the supply voltage. An outage detection circuit monitors the supply voltage and causes the power-up reset circuit to reset the microprocessor in the event that the supply voltage has sagged, thus causing the microprocessor to run through its power failure, sequence, and has returned to normal without completely failing, i.e., dropping to zero volts. The outage detection circuit is considered to be an important feature of the present invention.

Finally, the present invention includes several additional input and output interfaces to facilitate both the reception and transmission of data. This data may include the readings of the electrical energy measuring devices, instructions for modifying the preprogrammed data or the transmission of status information to external devices such as displays or relays.

DESCRIPTION OF THE PREFERRED EMBODIMENT

1. Brief Description

Figure 1:
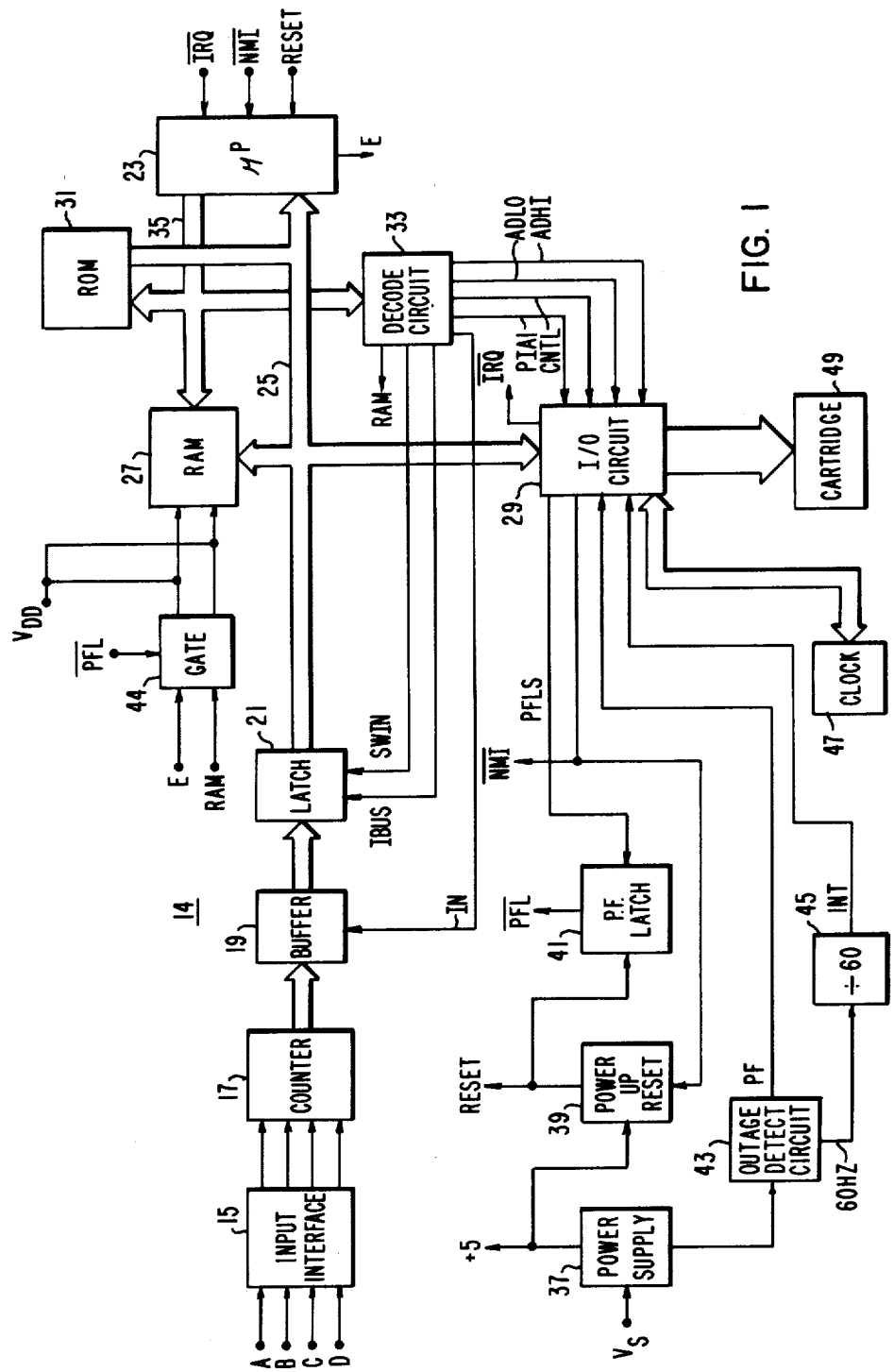
FIG. 1 is a simplified block diagram illustrating a solid-state event-logging system constructed according to the teachings of the present invention.

A solid-state event-logging system 14 constructed according to the teachings of the present invention is illustrated in FIG. 1. An input interface 15 receives data signals from a plurality of electrical energy metering devices. The system 14 shown in FIG. 1 has four discrete channels, A through D, inclusive, for monitoring four metering devices. The received data signals are composed of pulses which may be produced by a solid-state meter, a pulse initiator or the like. Each received pulse is representative of a quantized unit of electrical energy. The data signals are input to a counter 17 which continuously counts the pulses of each data signal. The counter 17 produces a running count representative of the data produced by each of the four metering devices.

A buffer 19 and a latch 21 form a sampling circuit which samples each of the four running counts. The buffer 19 chooses one of the running counts in response to a chip select signal IN and inputs the selected running count to the latch 21. The latch 21 holds the value of the running count selected by the buffer 19 thus producing a sample value. The latch 21 inputs the sample value to a microprocessor 23 through a data bus 25 in response to two chip select signals IBUS and SWIN.

The data bus 25 additionally interconnects a random access memory 27 (hereinafter RAM) and an input/output circuit 29. The microprocessor 23 is additionally connected to the RAM through an address bus 35. The address bus 35 additionally interconnects a read only memory 31 (hereinafter ROM) and a decode circuit 33. The microprocessor receives the sample value produced by the latch 21. This sample value has a prior sample value, which is stored in the RAM, subtracted therefrom. The difference produced by this subtraction is added to an interval sum stored in the RAM. There is one interval sum for each metering device monitored by the system 14. The ROM 31 includes preprogrammed information which includes the instructions for the microprocessor 23.

The microprocessor 23 produces a plurality of control signals which are input to the decode circuit 33. The decode circuit 33 aids the microprocessor 23 in addressing the various components of the system 14. The decode circuit 33 produces a plurality of chip select signals in response to the control signals of the microprocessor 23. These chip select signals include the IN, IBUS and the SWIN signals discussed above. The decode circuit 33 also produces a RAM, PIA1, CNTL, ADLO and ADHI chip select signals which are discussed hereinbelow.

The system 14 of FIG. 1 also includes a power supply 37 responsive to a source voltage $V_S$. The power supply produces a plurality of supply voltages for the system 14. A five-volt supply voltage is input to a power-up reset circuit 39. The circuit 39 produces a reset signal RESET in response to the leading edge of the five-volt supply voltage. The reset signal is input to the microprocessor 23 for resetting the microprocessor upon power-up of the system 14. The reset signal RESET is additionally input to a power failure latch 41.

The power supply 37 produces a signal which is input to an outage detection circuit 43. The outage detection circuit produces a power failure signal PF in response to the supply voltage dropping below a predetermined minimum voltage. This power failure signal PF is input to the input/output circuit 29. The input/output circuit 29 produces a non-maskable interrupt signal $\overline{\text{NMI}}$ which is input to the microprocessor 23. The microprocessor 23 runs through a power failure sequence in response to the $\overline{\text{NMI}}$ signal. One step is the power failure sequence is to set the power failure latch 41 with a PFLS signal produced by the input/output circuit 29. The $\overline{\text{NMI}}$ signal is additionally input to the power-up reset circuit 39. When the power failure latch 41 is set by the PFLS signal the latch produces a $\overline{\text{PFL}}$ signal. The $\overline{\text{PFL}}$ signal is input to a transmission gate 44. The $\overline{\text{PFL}}$ signal is input to a transmission gate 44. The transmission gate 44 disconnects the RAM 27 from the microprocessor 23. This is effected by disconnecting the RAM chip select signal produced by the decode circuit 33 and a system clock signal E produced by the microprocessor 23 from the input terminals of the RAM 27 and by tying these input terminals to a high source voltage $V_{DD}$. In this manner the RAM 27 is disconnected from the microprocessor 23 during a power failure.

In the event that the supply voltage merely sags but does not fail altogether, the power failure signal PF produced by the outage detection circuit 43 will change states. This causes the microprocessor 23 to perform a power failure sequence. When the voltage returns to acceptable levels the $\overline{\text{NMI}}$ signal will change states. When the $\overline{\text{NMI}}$ signal changes state the power-up reset circuit 39 will produce a reset signal for resetting the microprocessor 23 and the power failure latch 41. This reset sequence is necessary since the power-up reset circuit 39 is leading edge sensitive and will never reset the microprocessor 23 or the power failure latch 41 unless the voltage drops to zero volts. This reset sequence is necessary to prevent the microprocessor 23 from being stranded in a power failure mode due to a supply voltage which has merely fluctuated below acceptable values but has not failed altogether.

The outage detection circuit 43 also produces a sixty Hertz signal representative of the frequency of the source voltage $V_S$. The sixty Hertz signal is input to a counter 45 which divides the signal by sixty producing an interrupt signal INT every second. The interrupt signal INT is input to the input/output circuit 29 which produces an interrupt request signal $\overline{IRQ}$ in response thereto. The interrupt request signal $\overline{IRQ}$ is input to the microprocessor 23 and causes the microprocessor 23 to produce a clock interrogation signal. The clock interrogation signal is used to interrogate a clock 47 which produces real time information. The real time information is input to the RAM 27 through the input/output circuit 29 in response to the clock interrogation signal.

The microprocessor 23 maintains a sixty-second software counter which is responsive to the one second interrupt signals INT producing a synchronization count. Once each hour, when the seconds in the clock 47 have rolled over to zero-zero, the microprocessor 23 will check the synchronization count. If the clock 47 is within one second of correct time for the previous hour the synchronization count should be zero. If it is not, the microprocessor 23 will reset the clock 47 either forward or backward. In this manner, the clock circuit 47 is synchronized with the sixty Hertz source voltage $V_S$.

Finally, a stream of data is received by the input/output circuit 29 from the RAM 27 and is input to a removable memory cartridge 49. The stream of data includes the real time information produced by the clock 47, a portion of the preprogrammed information originally stored in the ROM 31 and the interval sums. The stream of data is written into the memory cartridge 49 according to a predetermined format and in response to the chip select signals PIA1, CNTL, ADLO, and ADHI produced by the decode circuit 33. Upon the successful recording of the stream of data the interval sums stored in the RAM 27 are reset to zero by the microprocessor 23. In this manner, a record of the events recognized by the electrical energy metering devices is produced. This concludes the brief description of the hardware and the operation of the present invention.

II. Detailed Description

Figure 2A:
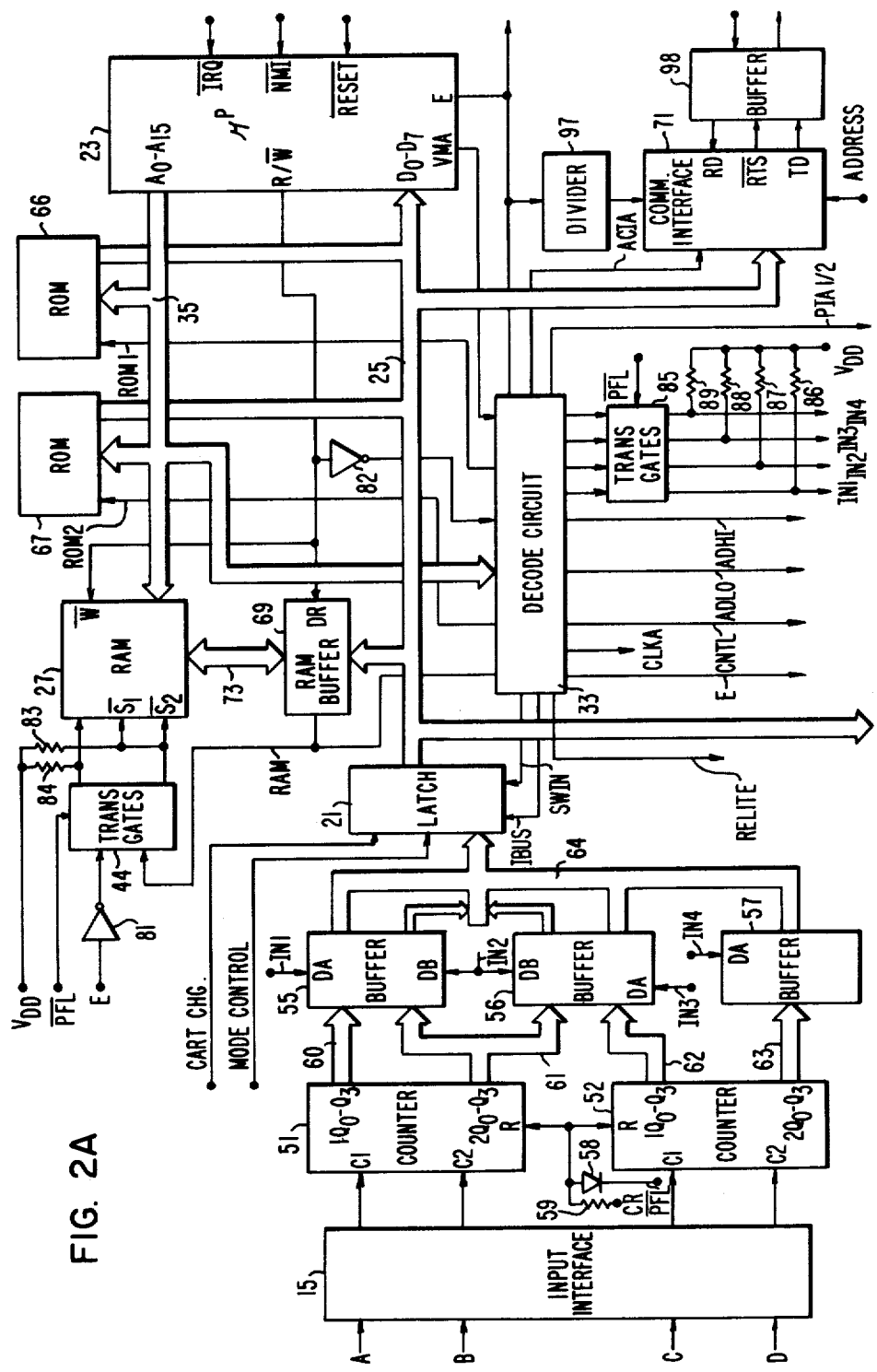
FIGS. 2A and 2B are a detailed block diagram illustrating a solid-state event-logging system constructed according to the teachings of the present invention.
Figure 2B:
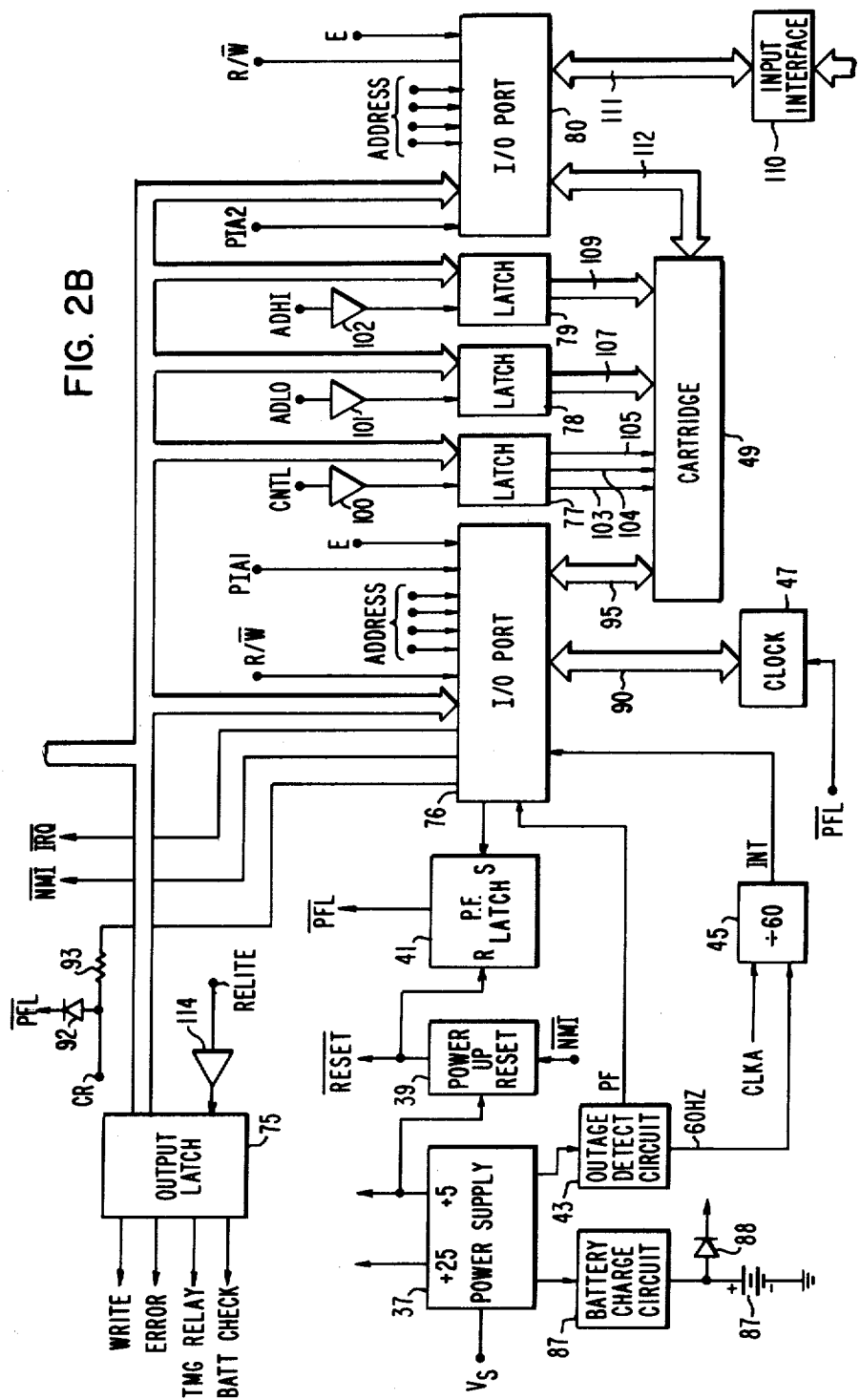

In FIGS. 2A and 2B a detailed block diagram illustrating the solid-state event-logging system 14 is shown. Identical components performing identical functions will have the same reference numerals as in FIG. 1. The A and B channels are input to a first input terminal C1 and a second input terminal C2, respectively, of a first counter 51 through the input interface 15. The C and D channels are input to a first input terminal C1 and a second input terminal C2, respectively, of a second counter 52 through the input interface 15. The first counter 51 and the second counter 52 each contain two discrete four-bit counters. Each of the four-bit counters has a four-bit parallel output $Q_0$-$Q_3$. The counters 51 and 52 each have a reset terminal R which receives both a counter reset signal CR through a resistor 59 and the $\overline{PFL}$ signal through a diode 58. The counters 51 and 52 perform the function of the counter 17 shown in FIG. 1.

The parallel output terminals $1Q_0$-$Q_3$ of the first four-bit counter of the counter 51 are connected to a buffer 55 through parallel conductors 60. The parallel output terminals $2Q_0$-$Q_3$ of the second four-bit counter of the counter 51 are connected to both the buffer 55 and a buffer 56 through parallel conductors 61. The parallel output terminals $1Q_0$-$Q_3$ of the first four-bit counter of the counter 52 are connected to the buffer 56 through parallel conductors 62. The parallel output terminals $2Q_0$-$Q_3$ of the second four-bit counter of the counter 52 are connected to a buffer 57 through parallel conductors 63. Each of the buffers 55, 56 and 57 contains six, one bit, three-state buffers. The first four buffers of the buffer 55 are responsive to the output terminals $1Q_0$-$Q_3$ of the first counter of the counter 51. The output terminals of these four buffers are parallel connected to the latch 21 through a data bus 64. The last two buffers of the buffer 55 and the first two buffers of the buffer 56 are responsive to the output terminals $2Q_0$-$Q_3$ of the second counter of the counter 51. The output terminals of these four buffers are parallel connected to the latch 21 through the data bus 64. Similarly, the last four buffers of the buffer 56 and the first four buffers of the buffer 57 are responsive to the output terminals $1Q_0$-$Q_3$ and $2Q_0$-$Q_3$ of the first and second counters, respectively, of the counter 52. The output terminals of these buffers are parallel connected to the latch 21 through the data bus 64. The buffers 55, 56 and 57 perform the function of the buffer 19 shown in FIG. 1.

The latch 21 is connected to input terminals $D_0$-$D_7$ of the microprocessor 23 through the data bus 25. The data bus 25 also interconnects a first ROM 66, a second ROM 67, a RAM buffer 69 and a communications interface 71. The ROM's 66 and 67 perform the function of the ROM 31 of FIG. 1. The RAM buffer 69 is connected to the RAM 27 through parallel conductors 73. Turning briefly to FIG. 2B, the data bus 25 additionally interconnects an output latch 75, and input/output port 76, a latch 77, a latch 78, a latch 79 and an input/output port 80 with the above-mentioned components. The input/output port 76 together with the latches 77, 78 and 79 perform the function of the input/output circuit 29 shown in FIG. 1.

Returning to FIG. 2A, the microprocessor 23 is connected at terminals $A_0$-$A_{15}$ to the RAM 27, the ROM's 66 and 67 and the decode circuit 33 through the address bus 35. The microprocessor 23 has a read/write output terminal R/$\overline{W}$ connected to the direction input terminal DR of the RAM buffer 69 and the write input terminal $\overline{W}$ of the RAM 27. The read/write output terminal R/$\overline{W}$ of the microprocessor 23 is additionally connected to the decode circuit 33 through an inverter 82.

The RAM chip select signal is input to an $\overline{S}_1$ and an $\overline{S}_2$ chip select input terminals of the RAM 27 through the transmission gate 44. The RAM 27 receives the system clock signal E at an input terminal through the series combination of an inverter 81 and the transmission gate 44. The transmission gate 44 also receives the $\overline{PFL}$ signal. The $\overline{S}_1$ and $\overline{S}_2$ chip select input terminals of the RAM 27 are connected to a voltage source $V_{DD}$ through a resistor 83. The input terminal of the RAM 27 which receives the system block signal E is connected to the voltage source $V_{DD}$ through a resistor 84.

The decode circuit 33 produces a plurality of chip select signals, some of which have already been discussed in conjunction with FIG. 1. Additional chip select signals include a ROM 1 signal input to the ROM 66, a ROM 2 signal input to the ROM 67, a RELITE signal input to the latch 75 and an ACIA signal input to the communications interface 71. The IN chip select signal shown in FIG. 1 is actually four-chip select signals IN1 through IN4 which are input to the buffers 55, 56 and 57 through a transmission gate 85. The transmission gate 85 also receives the $\overline{PFL}$ signal. A DA input terminal of the buffer 55 receives the IN1 signal and is connected to the voltage source $V_{DD}$ through a resistor 86. A DB input terminal of the buffer 55 and a DB input terminal of the buffer 56 receive the IN2 signal and are connected to the voltage source $V_{DD}$ through a resistor 87. A DA input terminal of the buffer 56 receives the IN3 signal and is connected to the voltage source $V_{DD}$ through a resistor 88. Finally, a DA input terminal of the buffer 57 receives the IN4 signal and is connected to the positive voltage source $V_{DD}$ through a resistor 89. The PIA1 chip select signal of FIG. 1 is input to two components, the input/output port 76 and the input/output port 80, and is therefore designated as PIA ½ in FIG. 2A. The chip select signals produced by the decode circuit 33 in response to the control signals of the microprocessor 23 and the components to which the signals are input are summarized in Table I below.

TABLE I

| Chip Select Signal | Component |
| --- | --- |
| IBUS | Latch 21 |
| SWIN | Latch 21 |
| RAM | RAM Buffer 69, RAM 27 |
| ROM 1 | ROM 66 |
| ROM 2 | ROM 67 |
| ACIA | Comm. Interface 71 |
| PIA½ | I/O Port 76, |
|  | I/O Port 80 |
| IN1 | Buffer 55 |
| IN2 | Buffer 55, Buffer 56 |
| IN3 | Buffer 56 |
| IN4 | Buffer 57 |
| ADHI | Latch 79 |
| ADLO | Latch 78 |
| CNTL | Latch 77 |
| RELITE | Latch 75 |

The decode circuit 33 additionally receives an address verification signal from a VMA output terminal of the microprocessor 23 and the system clock signal E from the microprocessor 23. The decode circuit 33 has an output terminal at which the system clock signal E is available and an output terminal at which a counter reset signal CLKA is available.

A cartridge change switch and a mode control switch (not shown) are connected to the microprocessor 23 through the latch 21 and the data bus 25. These two switches are used in conjunction with routines which an operator will instruct the microprocessor 23 to perform. The use of these two switches is discussed further hereinbelow.

Completing the description of FIG. 2A, the communications interface 71 receives the system clock signal E through a divider 97. The communications interface 71 has a single address input terminal responsive to the microprocessor 23. The communications interface 71 has a read data input terminal RD, a transmit data output terminal TD and a request to send terminal $\overline{RTS}$ which are used to communicate with an external terminal through a buffer 98. The communications interface 71 allows for the parallel-to-serial and serial-to-parallel conversion of information. The communications interface 71 is used to change the preprogrammed information, effect a cartridge change or facilitate the transmittal of data in a completely automated system. The functions of the communications interface 71 are further described hereinbelow.

Turning to FIG. 2B, the power supply 37 receives the primary supply voltage $V_S$ and produces a 25 volt supply voltage, the 5 volt supply voltage, the signal input to the outage detection circuit 43, and a voltage for a battery charging circuit 87. The battery charging circuit 87 continuously charges a nickel cadmium battery 87. The battery 87 provides a backup voltage $V_{DD}$ which is available through a diode 88, and is supplied to the RAM 27 during failure of primary supply $V_S$.

The five volt supply voltage is input to the power up reset 39. The power up reset 39 produces the reset signal $\overline{RESET}$ which is input to both the microprocessor 23 and a reset terminal R of the power failure latch 42. The outage detection circuit 43 produces the power failure signal PF which is input to the input/output port 76. The input/output port 76 produces the nonmaskable interrupt signal $\overline{NMI}$ which is input to both the power up reset 39 and the microprocessor 23. The input/output port 76 is connected to a set terminal S of the power failure latch 41. The power failure latch 41 produces the $\overline{PFL}$ signal.

The sixty hertz signal produced by the outage detection circuit 43 is input to the divide by sixty counter 45. The counter 45 also receives the CLKA reset signal produced by the decode circuit 33. The counter 45 produces the interrupt signal INT which is input to the input/output port 76. The input/output port 76 produces the interrupt request signal $\overline{IRQ}$ which is input to the microprocessor 23. The clock 47 receives the $\overline{PFL}$ signal at an input terminal thereof. The clock 47 is connected to the input/output port 76 through parallel conductors 90.

The input/output port 76 has an additional output terminal at which the counter reset signal CR is available through a resistor 93. The counter reset signal CR is inhibited by the $\overline{PFL}$ signal which is available through a diode 92. The input/output port 76 has a read/write input terminal R/W, a system clock input terminal E and four address input terminals which are all responsive to the microprocessor 23. The input/output port 76 has an input terminal responsive to the chip select PIA1 produced by the decode circuit 38. Finally, the input/output port 76 is connected to the cartridge 49 through parallel conductors 95. Because of the flexibility of the event-logging system disclosed herein the cartridge 49 may be an ultra-violet erasable, programmable, read only memory, a electrically erasable, programmable, read only memory, a random access memory or a magnetic bubble memory depending upon the software configuration of the system.

The latches 77, 78 and 79, in addition to being interconnected through the data bus 25, receive the chip select signals CNTL, ADLO and ADHI through inverters 100, 101 and 102, respectively. The latch 77 is connected to the cartridge 49 through series conductors 103, 104 and 105. The latches 78 and 79 are connected to the cartridge 49 through parallel conductors 107 and 109, respectively.

The input/output port 80 receives data from the encoding registers of the electric energy metering devices through an input interface 110 and parallel conductors 111. The input/output port 80 has a read/write input terminal R/W, a system clock input terminal E and four address input terminals all responsive to the microprocessor 23. The input/output port 80 has a chip select input terminal responsive to the PIA2 signal produced by the decode circuit 33. The input/output port 80 is connected to the cartridge through parallel conductors 112. The input/output port 80 is used to receive encoding information specifying the meter readings of the electric energy metering devices.

The remaining component in FIG. 2B is the output latch 75. The output latch 75, in addition to being interconnected through the data bus 25, receives the chip select signal RELITE from the decode circuit 38 through an inverter 114. The output latch 75 transmits status information to external devices such as displays or relays. Status information may include a write signal, an error signal, a timing relay signal, and a battery check signal. This concludes the description of the hardware shown in FIGS. 2A and 2B.

Figure 3:
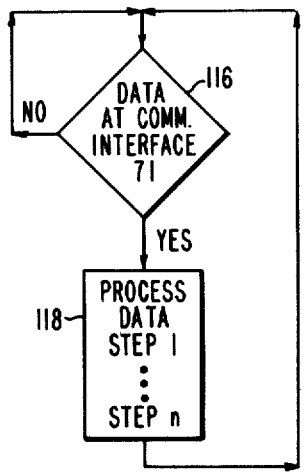
FIG. 3 is a logic block diagram illustrating the normal operation of the present invention.

The operation of the solid state event-logging system disclosed herein may be more easily understood by referring to the logic block diagrams illustrated in FIGS. 3 through 9. Turning first to FIG. 3, a simplified logic block diagram showing the normal operation of the present invention is illustrated. The microprocessor 23 interrogates the communications interface 71 as indicated by logic block 116. If no data is being input, the microprocessor 23 takes no action beyond continuing to interrogate the communicates interface 71. If, however, data is being input to the communications interface 71, the microprocessor will process that data as indicated by logic block 118. Processing the data may require the performance of a plurality of steps as indicated by the logic block 118. When the data has been processed, the microprocessor 23 returns to logic block 116 to again interrogate the communications interface 71.

Figure 5A:
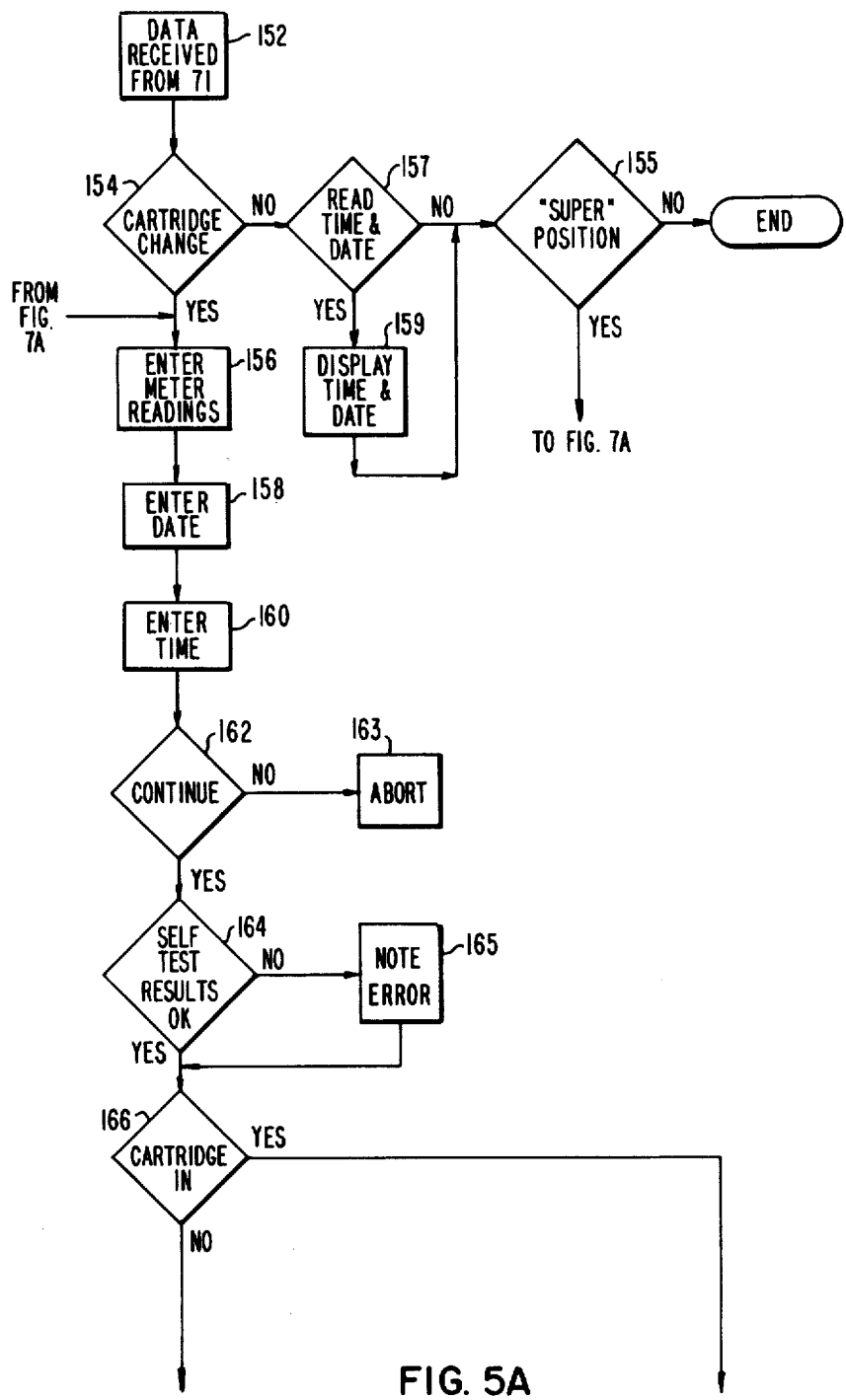
FIGS. 5A and 5B are logic block diagrams illustrating the instructions and data input to the present invention to facilitate a normal cartridge change.
Figure 5B:
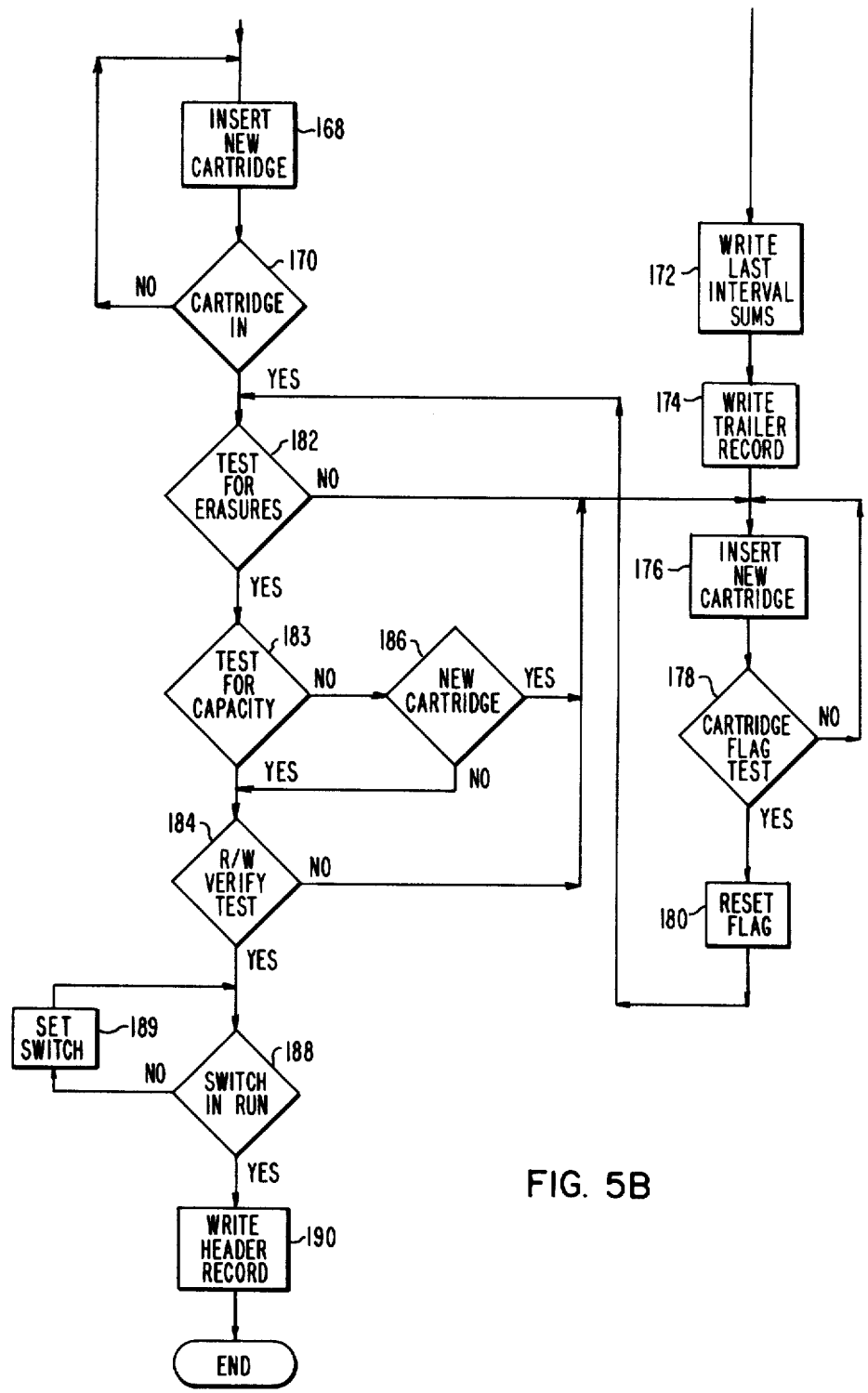
Figure 6A:
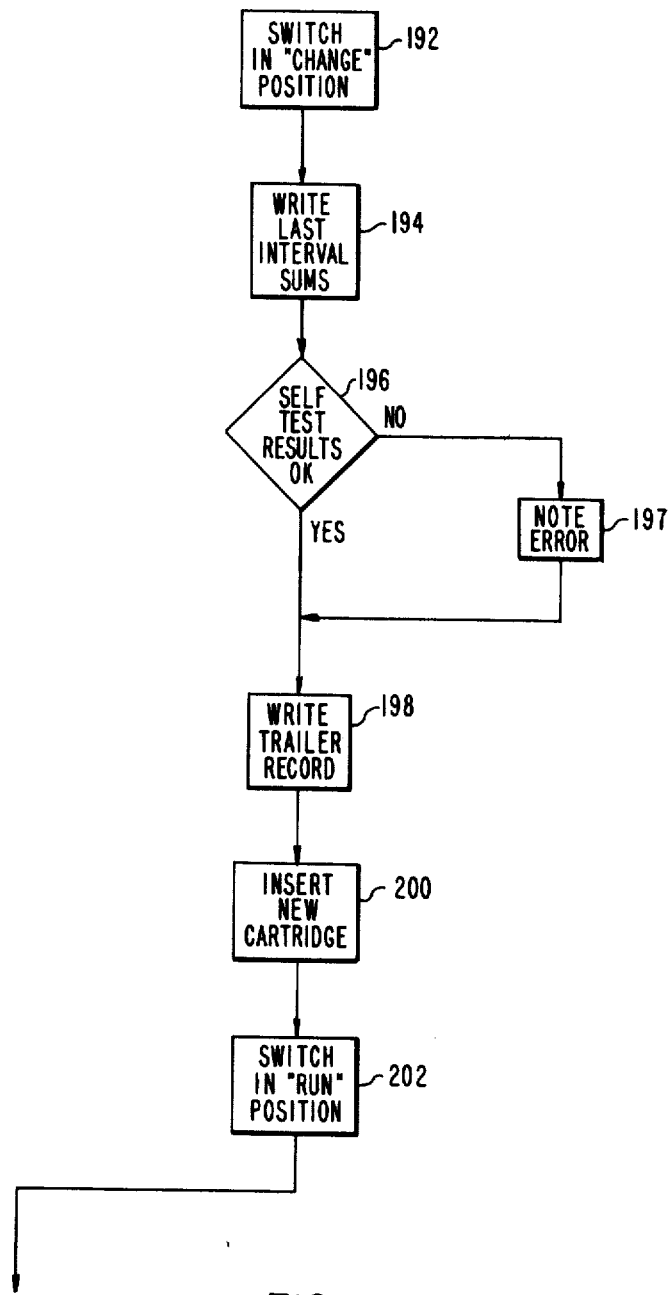
FIGS. 6A and 6B are logic block diagrams illustrating the instructions and data input to the present invention to facilitate a manual cartridge change.
Figure 6B:
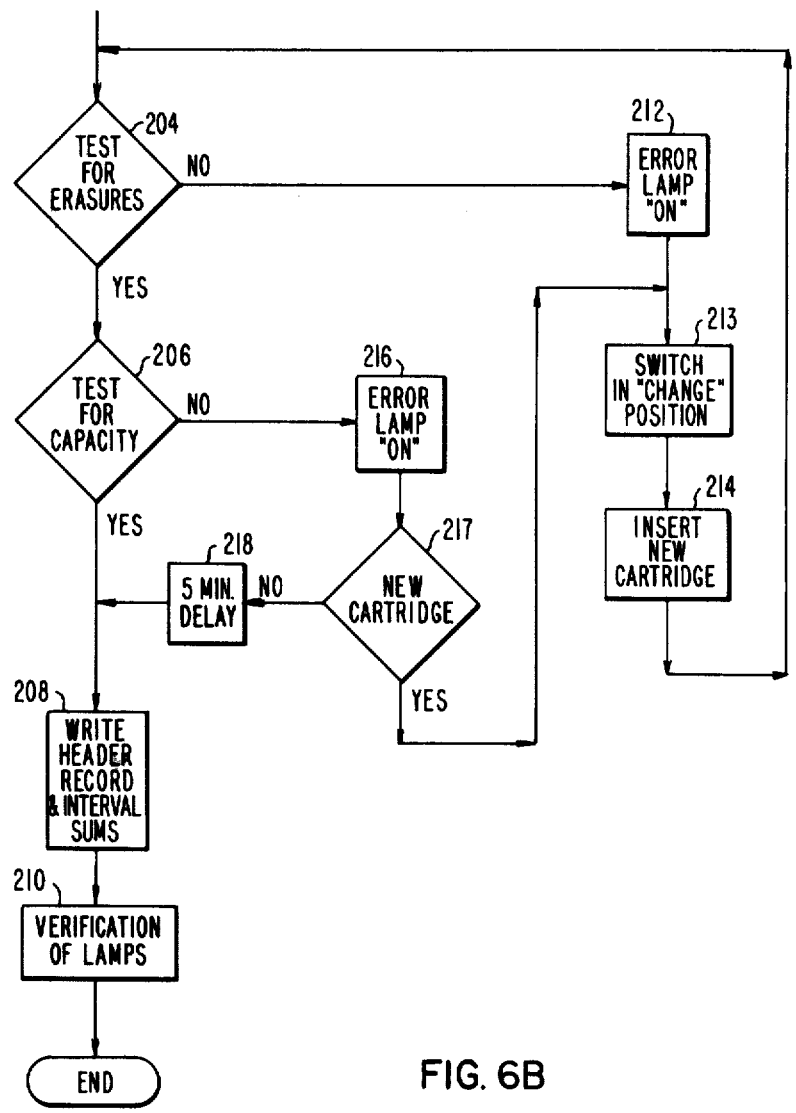
Figure 7A:
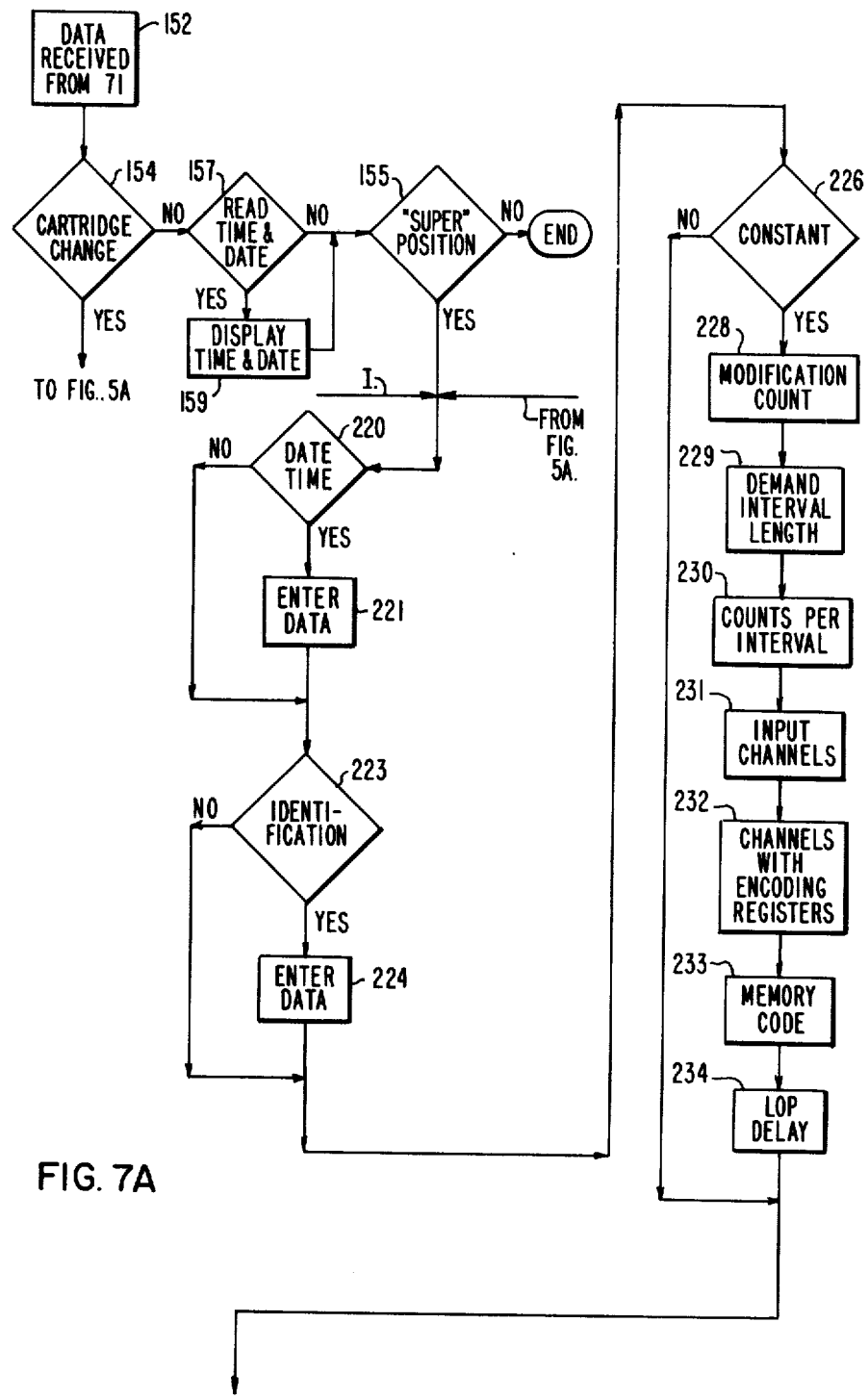
FIGS. 7A and 7B are logic block diagrams illustrating the instructions and data input to the present invention to facilitate a change of the preprogrammed information.
Figure 7B:
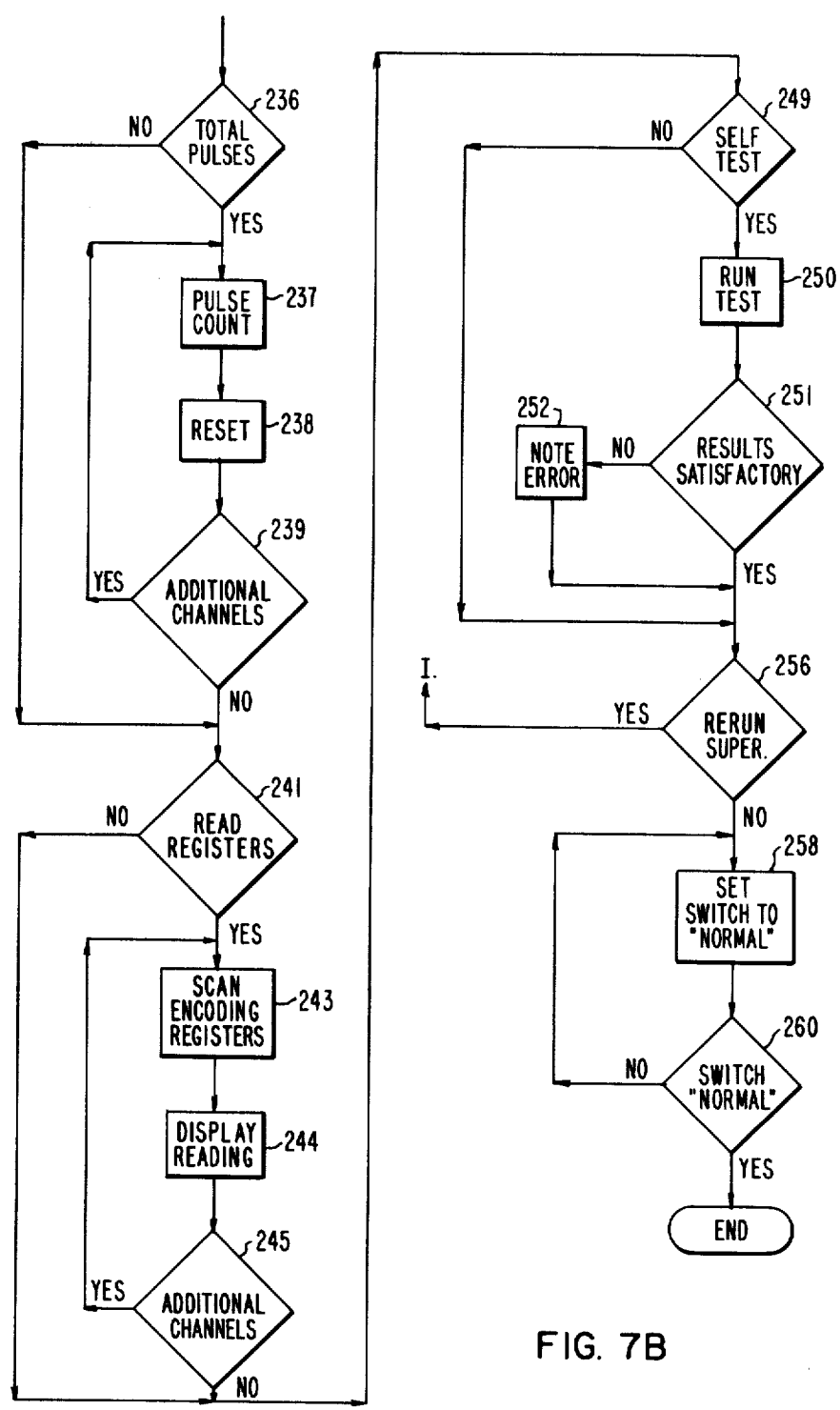

The data and associated steps represented by the logic block 118 may be substantially complicated. The logic block 118 may represent the instructions and data input to facilitate a normal cartridge change as shown in FIGS. 5A and 5B, the instructions and data input to facilitate a manual cartridge change as shown in FIGS. 6A and 6B or the instructions input to facilitate a change of the preprogrammed information as shown in FIGS. 7A and 7B. It is important to understand that the sequence shown in FIG. 3 may be interrupted by the interrupt request signal IRQ. The interrupt request signal IRQ is produced by the input/output port 76 in response to the interrupt signal INT produced by the counter 45. When the interrupt request signal IRQ is received by the microprocessor 23, the sequence shown in FIGS. 4A and 4B is carried out regardless of where the microprocessor is in the sequence shown in FIG. 3 or even if the microprocessor is processing data within the logic block 118.

Before continuing with the discussion of the logic block diagrams, a brief description of the initial synchronization of the counter 45, the clock 47, and the software synchronization count maintained by the microprocessor 23 is necessary. When the microprocessor 23 is first powered up, it continually monitors the real time clock 47 to determine when seconds roll over. When seconds roll over the microprocessor resets the divide by sixty counter 45 with the CLKA signal produced by the decode circuit 33. The microprocessor 23 then sets seconds in the real time clock 47 to zero and resets the sixty-second software counter to sixty. Thus, the divide by sixty counter 45, the clock 47 and the software synchronization count are initially synchronized.

Figure 4A:
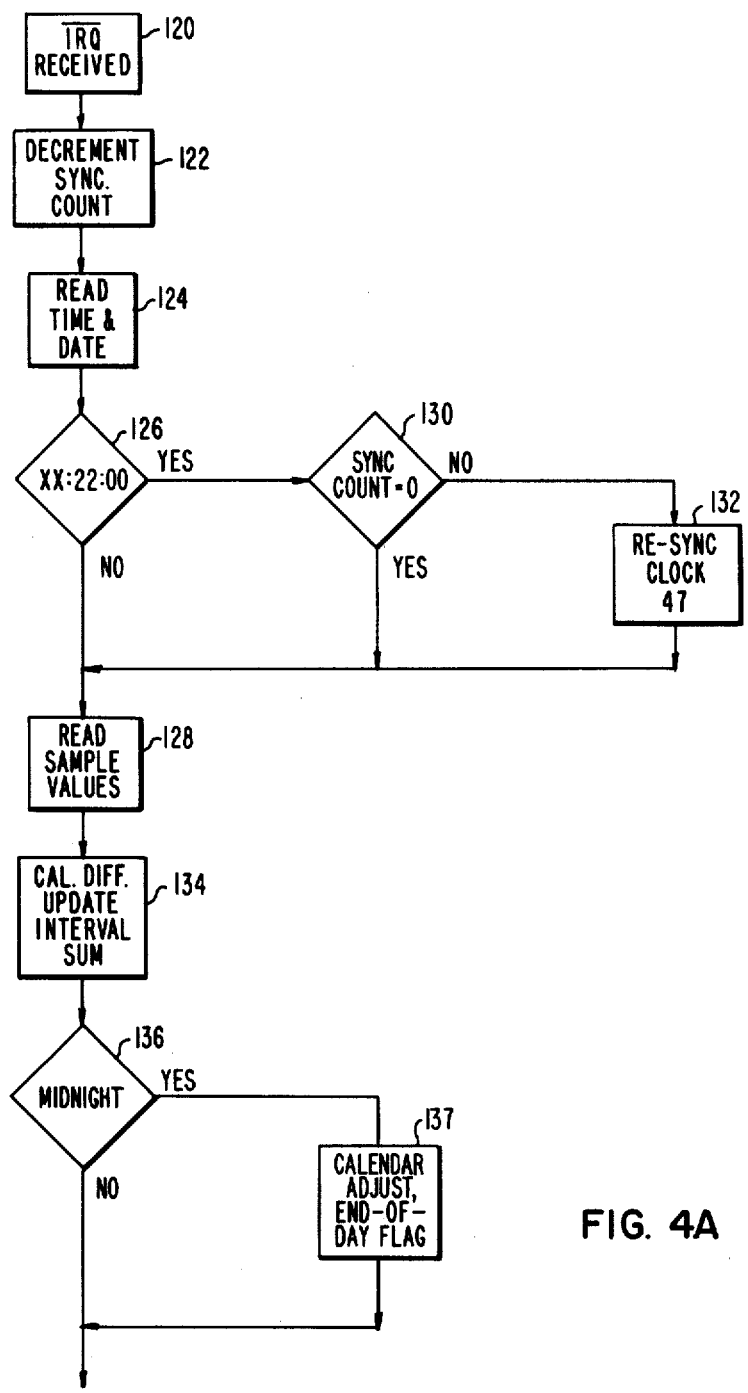
FIGS. 4A and 4B are logic block diagrams illustrating the operation of the present invention upon receiving an interrupt request signal.
Figure 4B:
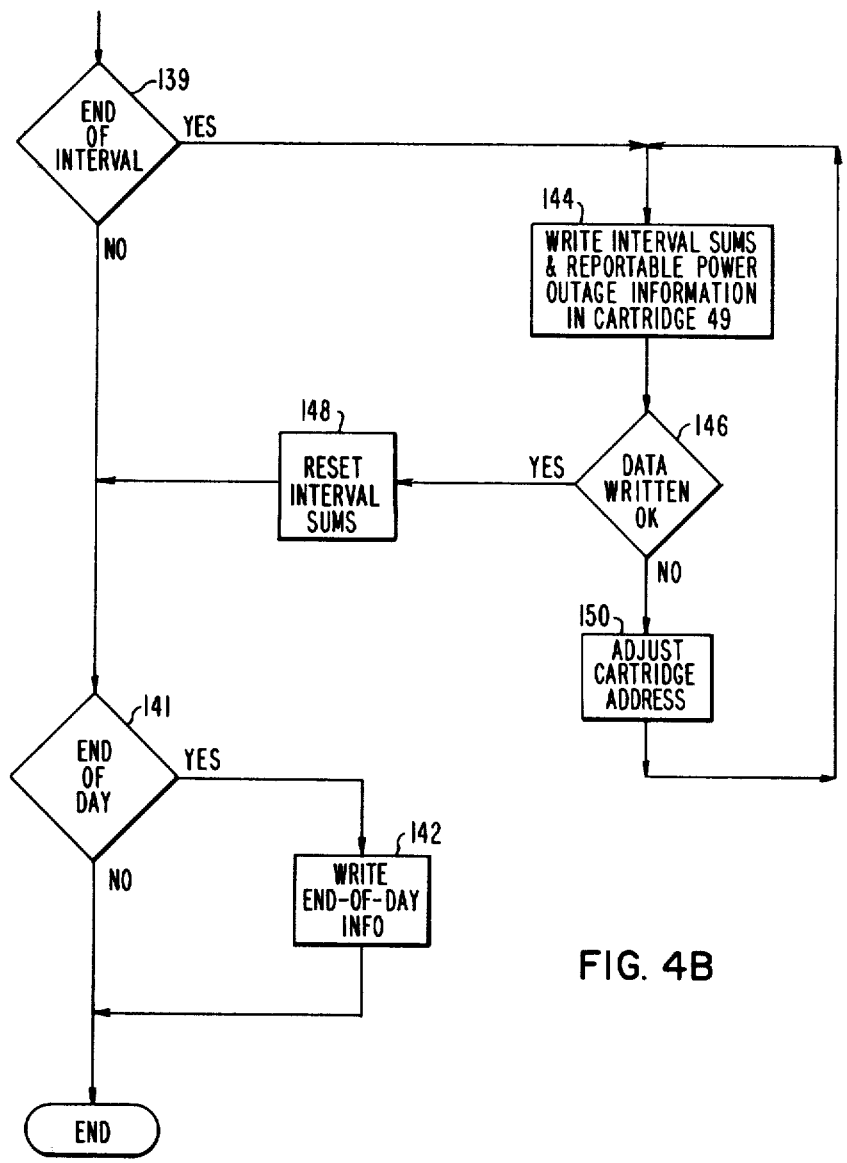

Turning now to FIGS. 4A and 4B, logic block diagrams illustrating the operation of the present invention upon the reception of an interrupt request signal IRQ are shown. Upon receiving the interrupt request signal IRQ at logic block 120, which should occur once each second, the microprocessor 23 decrements the synchronization count at logic block 122. The microprocessor 23 reads the time and date information from the real time clock 47 at logic block 124. The real time information is compared at decision step 126 to a predetermined clock reading. The microprocessor 23 is programmed to determine if the real time clock 47 is in synchronization with the line voltage. This is accomplished at steps 126, 130 and 132. The comparison at decision step 126 allows the microprocessor to determine when an hour has elapsed. As shown in FIG. 4A, each time the minute portion of a clock reading equals twenty-two, the microprocessor 23 recognizes that an hour has elapsed. Numbers other than twenty-two may be used provided they do not coincide with the end of a demand interval. The synchronization count is compared to zero as illustrated by the decision block 130. If the synchronization count equals zero the real time clock 47 is in synchronization with the sixty hertz line voltage. In this case the microprocessor 23 then reads the sample values produced by the operation of the buffers 55, 56 and 57 and the latch 21 as shown by logic block 128. If the real time clock 47 is not in synchronization with the sixty hertz line voltage the microprocessor 23 resynchronizes the clock 47 as shown by the logic block 132. Upon resynchronization the microprocessor proceeds to read the sample values. If at the decision step 126 an hour has not elapsed the microprocessor 23 proceeds directly to read the sample values.

After each sample value has been read at step 128, the newest sample value, i.e. the sample value just read, has the prior sample value subtracted therefrom. The difference produced by the subtraction is added to the interval sum stored in the RAM 27 as indicated by the logic block 134. The newest sample value is also stored in the RAM 27 as it becomes the prior sample value for the next calculation. The interval sum stored in the RAM 27 represents the total number of pulses received by the counter for a particular channel. There is, therefore, one interval sum for each channel to be monitored. Also, the use of the interval sums eliminates the need for resetting the counters. Because the counters are never reset the problem of resetting during the arrival of a pulse is eliminated.

After the update of the interval sums the microprocessor 23 determines if it is midnight at a decision step 136. If it is not midnight, the microprocessor proceeds to the decision step 139 shown in FIG. 4B wherein a determination is made if a demand interval has ended. If it is midnight the microprocessor 23 adjusts the calendar, if necessary, and sets on end of day flag at step 137. The microprocessor 23 then proceeds to the decision step 139.

The length of the demand interval is determined by the preprogrammed information and is typically on the order of five or fifteen minutes. If, at decision step 139, the end of a demand interval has not been reached the microprocessor determines if the end of a day has been reached at a decision step 141. If the end of a day has not been reached the microprocessor 23 returns to its initial condition before the interrupt request signal IRQ was received. If the end of a day has been reached the microprocessor 23 writes the end of day information at step 142 into the data cartridge 49 and returns to its original condition before the interrupt request signal IRQ was received.

Returning to the decision step 139, if the end of a demand interval has been reached the microprocessor 23 will turn on power to the cartridge (49) and write the interval sums and the reportable power outage information in the cartridge as illustrated by the logic block 144. The interval sums and reportable power outage information are written into the cartridge 49 according to a predetermined format. This format is illustrated in Table II, hereinafter.

represents the number of demand intervals during which there was no power. In rows 16 and 17 a check sum is recorded for diagnostic purposes. The entire procedure is repeated beginning at row 17 by the recording of the least significant bits of another start data

TABLE II

DATA RECORD

| ROW | MEMORY BYTES 7 6 5 4 3 2 1 0 | | DESCRIPTION |
|---|---|---|---|
| 1 | I          F1A          I | F1A: | LEAST SIG. 8 BITS OF START DATA FLAG |
| 2 | I     A1A     I F1B I | F1B: | MOST SIG. 2 BITS START DATA FLAG, |
|   |  | A1A: | LEAST SIG. 6 BITS 1ST INT SUM Ch. A |
| 3 | I  B1A   I   A1B | A1B: | MOST SIG. 4 BITS 1ST INT SUM Ch. A |
|   |  | B1A: | LEAST SIG. 4 BITS 1ST INT SUM Ch. B |
| 4 | I C1A I       B1B       I | B1B: | MOST SIG. 6 BITS 1ST INT SUM Ch. B |
|   |  | C1A: | LEAST SIG. 2 BITS 1ST INT SUM Ch. C |
| 5 | I        C1B        I | C1B: | MOST SIG. 8 BITS 1ST INT SUM Ch. C |
| 6 | I        D1A        I | D1A: | LEAST SIG. 8 BITS 1ST INT SUM Ch. D |
| 7 | I    A2A    I  D1B I | D1B: | MOST SIG. 2 BITS 1ST INT SUM Ch. D |
|   |  | A2A: | LEAST SIG. 6 BITS 2ND INT SUM Ch. A |
| 8 | I  B2A   I   A2B   I | A2B: | MOST SIG. 4 BITS 2ND INT SUM Ch. A |
|   |  | B2A: | LEAST SIG. 4 BITS 2ND INT SUM Ch. B |
| 9 | I C2A I       B2B       I | B2B: | MOST SIG. 6 BITS 2ND INT SUM Ch. B |
|   |  | C2A: | LEAST SIG. 2 BITS 2ND INT SUM Ch. C |
| 10 | I        C2B        I | C2B: | MOST SIG. 8 BITS 2ND INT SUM Ch. C |
| 11 | I        D2A        I | D2A: | LEAST SIG. 8 BITS 2ND INT SUM Ch. D |
| 12 | I    F2A    I  D2B I | D2B: | MOST SIG. 2 BITS 2ND INT SUM Ch. D |
|    |  | F2A: | LEAST SIG. 6 BITS LOP FLAG |
| 13 | I  L1A   I   F2B   I | F2B: | MOST SIG. 4 BITS LOP FLAG |
|    |  | L1A: | LEAST SIG. 4 BITS of LEAST SIG. WORD OF OUTAGE COUNT |
| 14 | I L2A I       L1B       I | L1B: | MOST SIG. 6 BITS OF LEAST SIG. WORD OF OUTAGE COUNT |
|    |  | L2A: | LEAST SIG. 2 BITS OF MOST SIG. WORD OF OUTAGE COUNT |
| 15 | I        L2B        I | L2B: | MOST SIG. 8 BITS OF MOST SIG. WORD OF OUTAGE COUNT |

ADDITIONAL CHANNEL COUNT DATA

| 16 | I        CSA        I | CSA: | LEAST SIG. 8 BITS OF RECORD CHECK SUM |
|---|---|---|---|
| 17 | I    F3A    I  CSB I | CSB: | MOST SIG. 2 BITS OF RECORD CHECK SUM |
|    |  | F3A: | LEAST SIG. 6 BITS OF START DATA RECORD FLAG |
| 18 | I   ANA   I    F3B    I | F3B: | MOST SIG. 4 BITS OF START DATA RECORD FLAG |
|    |  | ANA: | LEAST SIG. 4 BITS OF NTH INT SUM |

The format shown in Table II assumes a fifteen minute demand interval, a ten bit word length and an eight byte memory. The ten bit words are packed into the memory beginning with the least significant eight bits of a start data flag as shown in row 1. In row 2, the last two bits of the data flag and the six least significant bits of the first interval sum from channel A are recorded. In this manner the interval sums for each channel are packed into the memory locations as shown in rows 3 through 11. Rows 12 through 15 illustrate how power outage information may be recorded. A loss of power flag LOP is set which is followed by two ten bit words representative of an outage count. The outage count record flag.

Returning to FIG. 4B, after the data is written at step 144 in the cartridge 49 a check is performed to verify that the data has been written correctly as indicated by the decision step 146. If the data has been written correctly the interval sums are reset to zero at step 148, the microprocessor 23 removes the power from the cartridge 49 and then proceeds to the decision step 141. If the data has not been written correctly the microprocessor 23 adjusts the address within the cartridge 49 as shown by the logic block 150 and attempts to rewrite the information. If the information is still not correctly written the microprocessor 23 will continue to adjust the cartridge address according to a predetermined format until either the information is correctly written or the memory locations are exhausted. The verification performed by the microprocessor 23 to determine if the information has been correctly written and the format by which the microprocessor 23 continues to attempt to correctly write the information are considered to be important features of the present invention and are discussed further in conjunction with FIG. 8, hereinbelow.

In FIGS. 5A and 5B, a logic block diagram illustrating the instructions and data input to facilitate a normal cartridge change are illustrated. The logic block diagram illustrates both the sequence performed by the microprocessor 23 and the appropriate responses of the operator changing the cartridge. The normal cartridge change routine contemplates the use of a TERMIFLEX HT-10, or equivalent, hand-held terminal. The hand-held terminal communicates with the microprocessor 23 via the communications interface 71 and the buffer 98. During a normal cartridge change the cartridge change switch on the recorder is not used. The microprocessor 23 is programmed to ignore the cartridge change switch during a normal cartridge change.

The cartridge change routine is initiated by plugging in the hand-held terminal and pressing the line feed key. This initiates the sequence of steps beginning with logic block 152 wherein the microprocessor 23 receives data from the communications interface 71. The microprocessor 23 awaits further information at a decision step 154 to determine if the cartridge change routine is to be carried out. If the operator enters a "no" the possibility exists that a time and date reading are required. If a "yes" is entered at decision step 157 the time and date are displayed at step 159. After the time and date are displayed, or if a "no" is entered at step 157, the microprocessor 23 determines at decision step 155 if the mode control switch is in the "supervisor" position. If the mode control switch is not in the proper position the routine is terminated. If it is, the supervisory routine, shown in FIGS. 7A and 7B, is carried out.

If at the decision step 154 the operator has entered a "yes" the microprocessor 23 is prepared to receive meter readings as shown by block 156. These meter readings may be either manually entered through the hand-held terminal or automatically encoded through the input/output port 80. After the meter readings have been input the date and time information is input as shown by blocks 158 and 160. At a decision step 162 the microprocessor awaits instructions from the operator with respect to whether the cartridge change procedure is to be continued. If the operator enters a "no" the procedure is aborted as shown by logic block 163. If the operator enters a "yes" the microprocessor 23 performs a self-test represented by decision step 164. The self test may be any combination of a plurality of diagnostic routines for the eventlogging system including, but not limited to, a verification of a ROM checksum, a RAM checksum, or a battery test. If the results of the self-test are not satisfactory an appropriate error message is shown which the operator records in his notebook and an error flag is set in the RAM 27. This is represented by logic block 165.

After the self-test, or after the notation of the error, the microprocessor 23 determines at decision step 166 if a cartridge 49 is inserted in the recorder. If a cartridge 49 is not inserted, which will be the case during initial operation, the operator will insert a new cartridge as shown by logic block 168, shown in FIG. 5B. The microprocessor 23 again tests to determine if a cartridge 49 is inserted at decision step 170. If a cartridge 49 is not yet in place, or is improperly inserted into the recorder, the operator must reinsert a new cartridge as shown by the logic block 168. If at the decision step 170 the cartridge is properly inserted the microprocessor 23 proceeds to perform a series of diagnostic tests. It should be emphasized that the steps 168 and 170 are not normally carried out.

Returning to the decision step 166, in the majority of cases the cartridge 49 will be in place. The microprocessor 23 then proceeds to write the last interval sums and the trailer record as shown by logic blocks 172 and 174, shown in FIG. 5B. An example of a trailer record is shown in Table III below. The trailer record and its contents are discussed in detail hereinbelow. Once the last interval sum and the trailer record have been recorded the old data cartridge is removed and a new data cartridge is inserted as shown by logic block 176. The microprocessor 23 then checks if a cartridge flag has been set. This is illustrated by decision step 178. If the cartridge flag has not been set, the data cartridge must be reinserted. If, however, the cartridge flag has been set, the flag is reset at a step 180 and the microprocessor proceeds with the diagnostic testing of the new data cartridge.

Beginning at decision step 182, the microprocessor 23 performs three diagnostic tests on the new data cartridge. The microprocessor 23 tests for erasures at decision step 182 to ensure a fresh cartridge is being used, tests, for capacity at decision step 182 to determine if the cartridge has sufficient capacity for its intended use, and verifies the cartridge's read/write ability at decision step 184. If the cartridge fails the erasure test of decision step 182 or the read/write test of step 184 a new cartridge must be inserted and the microprocessor 23 returns to the logic block 176. If the cartridge fails the capacity test of decision step 183 the operator is given the alternative of replacing the defective cartridge with a new cartridge or continuing with the defective cartridge as shown by decision step 186. If the operator chooses to insert a new cartridge the microprocessor returns to logic block 176. If the operator chooses to continue with the defective cartridge the microprocessor 23 proceeds to the decision step 184. It may be advantageous to proceed with a defective cartridge when no new cartridges are available or when data is to be recorded over a shorter periof of time than normal.

Once the new cartridge is inserted and the diagnostic tests have been passed, the microprocessor determines if the cartridge change switch is in the "run" position at decision step 188. If the switch is not in the proper position the operator will take corrective action as shown by logic block 189. Once the switch is in the proper position, a header record is written in the new cartridge as shown by block 190. The format of the header record is shown and described in conjunction with Table IV hereinbelow. Once the header record has been written the cartridge change procedure illustrated in FIGS. 5A and 5B is completed.

TABLE III

TRAILER RECORD

| ROW | NO. BYTES | FORMAT | DESCRIPTION |
|---|---|---|---|
| 1 | 1 | HEX | START TRAILER FLAG |
| 2 | 14 | ASCII | CUSTOMER ACCOUNT IDENTIFICATION, SAME AS IN HEADER AND PREPROGRAMMED INFO |
| 3 | 1 | 2 BCD DIGITS | SECONDS, END TIME OF CARTRIDGE FROM CLOCK. (10'S DIGIT, 1'S DIGIT) |
| 4 | 1 | 2 BCD DIGITS | MINUTES, END TIME OF CARTRIDGE FROM CLOCK |
| 5 | 1 | 2 BCD DIGITS | HOURS, END TIME OF CARTRIDGE FROM CLOCK |
| 6 | 1 | 2 BCD DIGITS | DAY-OF-YEAR, 10'S DIGIT, 1'S DIGIT, END DATE OF CARTRIDGE FROM CLOCK |
| 7 | 1 | X X 0 0 Y Y Y Y | LEAP YR COUNT, DAY-OF-YEAR, 100'S DIGIT, END TIME OF CARTRIDGE FROM CLOCK XX = LEAP YR COUNT, 0 = LP YR YYYY = BCD FOR 100'S DIGIT, DAY-OF-YR |
| 8 | 1 | 2 BCD DIGITS | SECONDS, END TIME OF CARTRIDGE FROM OPERATOR |
| 9 | 1 | 2 BCD DIGITS | MINUTES, END TIME OF CARTRIDGE FROM OPERATOR |
| 10 | 1 | 2 BCD DIGITS | HOURS, END TIME OF CARTRIDGE FROM OPERATOR |
| 11 | 1 | 2 BCD DIGITS | DAY-OF-YEAR, 10'S & 1'S DIGIT, END DATE OF CARTRIDGE FROM OPERATOR |
| 12 | 1 | X X 0 0 Y Y Y Y | LEAP YR COUNT & 100'S DIGIT OF DAY-OF-YEAR, END DATE OF CARTRIDGE FROM OPERATOR |
| 13 | 1 | 2 BCD DIGITS | CH A ENCODING REG END READING, FLGS, DIGIT 7 |
| 14 | 1 | 2 BCD DIGITS | CH A ENCODING REG END READING, DIGITS 6,5 |
| 15 | 1 | 2 BCD DIGITS | CH A ENCODING REG END READING, DIGITS 4,3 |
| 16 | 1 | 2 BCD DIGITS | CH A ENCODING REG END READING, DIGITS 2,1 |
| 17 | 1 | 2 BCD DIGITS | CH B ENCODING REG END READING, FLGS, DIGIT 7 |
| 18 | 1 | 2 BCD DIGITS | CH B ENCODING REG END READING, DIGITS 6,5 |
| 19 | 1 | 2 BCD DIGITS | CH B ENCODING REG END READING, DIGITS 4,3 |
| 20 | 1 | 2 BCD DIGITS | CH B ENCODING REG END READING, DIGITS 2,1 |
| 21 | 1 | 2 BCD DIGITS | CH C ENCODING REG END READING, FLGS, DIGIT 7 |
| 22 | 1 | 2 BCD DIGITS | CH C ENCODING REG END READING, DIGITS 6,5 |
| 23 | 1 | 2 BCD DIGITS | CH C ENCODING REG END READING, DIGITS 4,3 |
| 24 | 1 | 2 BCD DIGITS | CH C ENCODING REG END READING, DIGITS 2,1 |
| 25 | 1 | 2 BCD DIGITS | CH D ENCODING REG END READING, FLGS, DIGIT 7 |
| 26 | 1 | 2 BCD DIGITS | CH D ENCODING REG END READING, DIGITS 6,5 |
| 27 | 1 | 2 BCD DIGITS | CH D ENCODING REG END READING, DIGITS 4,3 |
| 28 | 1 | 2 BCD DIGITS | CH D ENCODING REG END READING, DIGITS 2,1 |
| 29 | 1 | A B C D 0 0 0 0 | FLAGS FOR BCH ERROR DURING TRANSMISSION BETWEEN ENCODER AND RECORDER A=1 ERROR ON CH A B=1 ERROR ON CH B C=1 ERROR ON CH C D=1 ERROR ON CH D |
| 30 | 1 | 0000, BCD DIG | CH A VISUAL REG END READING, 0, DIGIT 5 |
| 31 | 1 | 2 BCD DIGITS | CH A VISUAL REG END READING, DIGITS 4,3 |
| 32 | 1 | 2 BCD DIGITS | CH A VISUAL REG END READING, DIGITS 2,1 |
| 33 | 1 | 0000, BCD DIG | CH B VISUAL REG END READING, 0, DIGIT 5 |
| 34 | 1 | 2 BCD DIGITS | CH B VISUAL REG END READING, DIGITS 4,3 |
| 35 | 1 | 2 BCD DIGITS | CH B VISUAL REG END READING, DIGITS 2,1 |
| 36 | 1 | 0000, BCD DIG | CH C VISUAL REG END READING, 0, DIGIT 5 |

TABLE III-continued
TRAILER RECORD

| ROW | NO. BYTES | FORMAT | DESCRIPTION |
|---|---|---|---|
| 37 | 1 | 2 BCD DIGITS | CH C VISUAL REG END READING, DIGITS 4,3 |
| 38 | 1 | 2 BCD DIGITS | CH C VISUAL REG END READING, DIGITS 2,1 |
| 39 | 1 | 0000, BCD DIG | CH D VISUAL REG END READING, 0, DIGIT 5 |
| 40 | 1 | 2 BCD DIGITS | CH D VISUAL REG END READING, DIGITS 4,3 |
| 41 | 1 | 2 BCD DIGITS | CH D VISUAL REG END READING, DIGITS 2,1 |
| 42 | 1 | HEX | RECORDER SELF TEST ERROR FLAGS |
| 43 | 1 | HEX | CHECK SUM OF ALL TRAILER LOCATIONS |
| Total | 56 | | |

TABLE IV
HEADER RECORD

| ROW | NO. BYTES | FORMAT | DESCRIPTION |
|---|---|---|---|
| 1 | 2 | 00,FF HEX | WRITTEN AT CARTRIDGE INSTALLATION TO VERIFY CARTRIDGE WRITE CAPABILITY |
| 2 | 1 | 2 HEX DIGITS | SET TO 00 IN RAM, INCREMENT BY 1 EACH TIME ANY CONSTANT EXCEPT ID IS MODIFIED THROUGH TERMINAL BY OPERATOR |
| 3 | 14 | ASCII | 14 ALPHA-NUMERIC CHARACTERS FOR CUSTOMER ACCOUNT IDENTIFICATION, SET TO ALL ZEROES IN ROM |
| 4 | 1 | 0 C C C 0 L L L | CCC REPRESENTS MAXIMUM COUNTS PER INTERVAL<br>000 = 500 COUNTS (9 BITS)<br>001 = 1000 COUNTS (10 BITS)<br>010 = 2000 COUNTS (11 BITS)<br>011 = 4000 COUNTS (12 BITS)<br>LLL REPRESENTS LENGTH OF RECORDED INTERVAL<br>000 = 5 MIN. INTERVAL<br>001 = 15 MIN. INTERVAL<br>010 = 30 MIN. INTERVAL |
| 5 | 1 | 7 6 5 4 3 2 1 0 | BITS 7 THRU 4 ARE FLAGS FOR CHANNELS WITH ENCODING REGISTERS PRESENT: BIT 7-CH A, BIT 6-CH B, BIT 5-CH C, BIT 4-CH D<br>BITS 3 THRU 0 ARE FLAGS FOR CHANNELS TO BE RECORDED: BIT 3-CH A, BIT 2-CH B, BIT 1-CH C, BIT 0-CH D |
| 6 | 1 | 2 HEX DIGITS | MEMORY CAPACITY CODE TO SPECIFY MINIMUM SIZE CARTRIDGE TO MEET RECORDER APPLICATION |
| 7 | 1 | 2 HEX DIGITS | RATIO FOR DIVIDING CHANNEL A INPUT COUNTS. (00 = ÷ 1, 0F = ÷ 16) |
| 8 | 1 | 2 HEX DIGITS | RATIO FOR DIVIDING CH B INPUT COUNTS, SIM TO A |
| 9 | 1 | 2 HEX DIGITS | RATIO FOR DIVIDING CH C INPUT COUNTS, SIM TO A |
| 10 | 1 | 2 HEX DIGITS | RATIO FOR DIVIDING CH D INPUT COUNTS, SIM TO A |
| 11 | 2 | 4 BCD | MINIMUM TIME DURATION FOR REPORTABLE OUTAGE. STORED AS A BINARY COUNT WITH EACH COUNT EQUAL TO 2 SEC. RANGE 2 SEC. to 8.5 MIN. |
| 12 | 6 | 2 HEX DIGITS | SPARES |
| 13 | 1 | 2 HEX DIGITS | CHECK SUM OF ABOVE CONSTANT LOCATIONS FOR VERIFICATION OF CONSTANTS |
| 14 | 1 | 2 BCD DIGITS | SECONDS, START TIME OF CARTRIDGE FROM CLOCK. (10'S DIGIT, 1'S DIGIT) |
| 15 | 1 | 2 BCD DIGITS | MINUTES, START TIME OF CARTRIDGE FROM CLOCK |
| 16 | 1 | 2 BCD DIGITS | HOURS, START TIME OF CARTRIDGE FROM CLOCK |
| 17 | 1 | 2 BCD DIGITS | DAY-OF-YEAR, 10'S DIGIT, 1'S DIGIT, START DATE OF CARTRIDGE FROM CLOCK |
| 18 | 1 | X X 0 0 Y Y Y Y | LEAP YR COUNT, DAY-OF-YEAR, 100'S DIGIT, START TIME OF CARTRIDGE FROM CLOCK. XX = LEAP YR COUNT, 0 = LP YR, YYYY = BCD FOR 100'S DIGIT, DAY-OF-YEAR |
| 19 | 1 | 2 BCD DIGITS | SECONDS, START TIME OF CARTRIDGE FROM |

TABLE IV-continued
HEADER RECORD

| ROW | NO. BYTES | FORMAT | DESCRIPTION |
|---|---|---|---|
| 20 | 1 | 2 BCD DIGITS | MINUTES, START TIME OF CARTRIDGE FROM OPERATOR |
| 21 | 1 | 2 BCD DIGITS | HOURS, START TIME OF CARTRIDGE FROM OPERATOR |
| 22 | 1 | 2 BCD DIGITS | DAY-OF-YEAR, 10'S & 1'S DIGIT, START DATE OF CARTRIDGE FROM OPERATOR |
| 23 | 1 | X X 0 0 Y Y Y Y | LEAP YR COUNT & 100'S DIGIT OF DAY-OF-YR, START DATE OF CARTRIDGE FROM OPERATOR |
| 24 | 1 | 2 BCD DIGITS | CH A ENCODING REG START READING, FLGS, DIGIT 7 |
| 25 | 1 | 2 BCD DIGITS | CH A ENCODING REG START READING, DIGITS 6,5 |
| 26 | 1 | 2 BCD DIGITS | CH A ENCODING REG START READING, DIGITS 4,3 |
| 27 | 1 | 2 BCD DIGITS | CH A ENCODING REG START READING, DIGITS 2,1 |
| 28 | 1 | 2 BCD DIGITS | CH B ENCODING REG START READING, FLGS, DIGIT 7 |
| 29 | 1 | 2 BCD DIGITS | CH B ENCODING REG START READING, DIGITS 6,5 |
| 30 | 1 | 2 BCD DIGITS | CH B ENCODING REG START READING, DIGITS 4,3 |
| 31 | 1 | 2 BCD DIGITS | CH B ENCODING REG START READING, DIGITS 2,1 |
| 32 | 1 | 2 BCD DIGITS | CH C ENCODING REG START READING, FLGS, DIGIT 7 |
| 33 | 1 | 2 BCD DIGITS | CH C ENCODING REG START READING, DIGITS 6,5 |
| 34 | 1 | 2 BCD DIGITS | CH C ENCODING REG START READING, DIGITS 4,3 |
| 35 | 1 | 2 BCD DIGITS | CH C ENCODING REG START READING, DIGITS 2,1 |
| 36 | 1 | 2 BCD DIGITS | CH D ENCODING REG START READING, FLGS, DIGIT 7 |
| 37 | 1 | 2 BCD DIGITS | CH D ENCODING REG START READING, DIGITS 6,5 |
| 38 | 1 | 2 BCD DIGITS | CH D ENCODING REG START READING, DIGITS 4,3 |
| 39 | 1 | 2 BCD DIGITS | CH D ENCODING REG START READING, DIGITS 2,1 |
| 40 | 1 | A B C D 0 0 0 0 | FLAGS FOR BCH ERROR DURING TRANSMISSION BETWEEN ENCODER AND RECORDER A = 1 ERROR ON CH A B = 1 ERROR ON CH B C = 1 ERROR ON CH C D = 1ERROR ON CH D |
| 41 | 1 | 0000, BCD DIG | CH A VISUAL REG START READING, 0, DIGIT 5 |
| 42 | 1 | 2 BCD DIGITS | CH A VISUAL REG START READING, DIGITS 4,3 |
| 43 | 1 | 2 BCD DIGITS | CH A VISUAL REG START READING, DIGITS 2,1 |
| 44 | 1 | 0000, BCD DIG | CH B VISUAL REG START READING, 0, DIGIT 5 |
| 45 | 1 | 2 BCD DIGITS | CH B VISUAL REG START READING, DIGITS 4,3 |
| 46 | 1 | 2 BCD DIGITS | CH B VISUAL REG START READING, DIGITS 2,1 |
| 47 | 1 | 0000, BCD DIG | CH C VISUAL REG START READING, 0, DIGIT 5 |
| 48 | 1 | 2 BCD DIGITS | CH C VISUAL REG START READING, DIGITS 4,3 |
| 49 | 1 | 2 BCD DIGITS | CH C VISUAL REG START READING, DIGITS 2,1 |
| 50 | 1 | 0000, BCD DIG | CH D VISUAL REG START READING, 0, DIGIT 5 |
| 51 | 1 | 2 BCD DIGITS | CH D VISUAL REG START READING, DIGITS 4,3 |
| 52 | 1 | 2 BCD DIGITS | CH D VISUAL REG START READING, DIGITS 2,1 |
| 53 | 11 | | SPARES |
| 54 | 1 | HEX | CHECK SUM OF ALL HEADER LOCATIONS |
| Total | 84 | | |

The header record and trailer record illustrated in Tables IV and III are written at the beginning and the In rows 14 through 18 time information from the clock 47 and the RAM 27 is written in the cartridge. The identical information is manually written from the operator in rows 19 through 23, inclusive. Meter reading information is written from either encoding registers as shown by rows 24 through 39, inclusive, or manually from the operator as shown by rows 41 through 52, inclusive. If encoding registers are used one byte is used for a BCH error check as illustrated by row 40. Finally, one byte is provided, at row 54, as a check sum of the header sum locations.

In Table III the first byte of the trailer record is used as a start trailer flag. The next fourteen bytes are used for indentification of the customer's account. The next five bytes, rows 3 through 7, are used for time and date information from the clock 47 and the RAM 27. The next five bytes, found in rows 8 through 12, inclusive, are used for manually writing the time and date information from the operator. Meter readings are written from either encoding registers as shown by rows 13 through 28, inclusive, or manually from the operator as shown by rows 30 through 41, inclusive. If the meter readings are written by encoding registers one byte is used for a BCH error check as shown by row 29. The last two bytes of the trailer record are used for the self-test results and a check sum. The cartridge is thus used to report the failure of any of the diagnostic self tests performed on the event-logging system. This concludes the description of FIGS. 5A and 5B illustrating the procedure for a normal cartridge change and the description of Tables IV and III illustrating the header and trailer records recorded at the beginning and the end, respectively, of each data cartridge.

FIGS. 6A and 6B are logic block diagrams illustrating the instructions and data input to facilitate a manual cartridge change. The manual cartridge change procedure may be used in lieu of the normal cartridge change procedure whenever a hand-held terminal is not available. The reader will notice substantial similarities between the manual cartridge change procedure and the normal cartridge procedure.

In the manual cartridge change procedure, the operator manually records the customer indentification number, time and date information, and the meter readings on a report form. The operator then places the cartridge change switch in the "change" position. Placing the switch in the "change" position initiates the cartridge change routine as shown by logic block 192. The microprocessor 23 will write the last interval sums in the data cartridge 49 as shown by logic block 194. The microprocessor 23 then performs a self-test as indicated by decision step 196. If the results of the self-test are not satisfactory the error lamp is turned on and an internal error flag is set by the microprocessor 23. The operator makes a note on the report form of the error as shown by logic block 197. After notation of the error, or if the results of the self-test are satisfactory, the microprocessor 23 will write the trailer record in the data cartridge 49 as shown by logic block 198. When the trailer record has been recorded, a record lamp will go off and the operator may remove the old cartridge and store it with the filled out report form.

After the old cartridge has been removed a new cartridge is inserted by the operator as shown by logic block 200. With the new cartridge inserted, the operator places the cartridge change switch into the "run" position as shown by logic block 202. The microprocessor 23 then performs two diagnostic tests. The tests, shown in FIG. 6B, include a test for erasures as shown by decision step 204 and a test for capacity as shown by decision step 206. Upon successful completion of both diagnostic tests the microprocessor 23 writes the header record and any available interval sums in the new cartridge as illustrated by logic block 208. The operator then verifies that the error lamp is off and that the write lamp is working properly as shown by logic block 210 which is the last step in the manual change procedure.

If the new cartridge fails the erasure test represented by decision step 204, the error lamp is turned on at step 212. The operator then places the cartridge change switch into the "change" position at step 213 and inserts a new cartridge at step 214. This new cartridge is then subjected to the diagnostic tests represented by steps 204 and 206.

If the new cartridge fails the test for capacity represented by decision step 206, the error lamp is turned on at step 216. The operator then has the option, at decision step 217, to either insert a new cartridge or continue with the defective cartridge. If the operator decides to insert a new cartridge the cartridge change switch must be placed in the "change" position as shown by the step 213 and the new cartridge inserted at step 214. If the operator chooses to continue with the defective cartridge the microprocessor institutes a five minute delay as shown by logic block 218. After the delay, the microprocessor continues with the remainder of the manual cartridge change procedure. This concludes the description of FIGS. 6A and 6B.

FIGS. 7A and 7B are logic block diagrams illustrating a supervisor routine. The supervisor routine is used to facilitate a change or modification of the preprogrammed information. When data is received by the microprocessor 23, see decision step 152 of FIG. 7A, the microprocessor 23 must be informed by the operator at decision step 154 if a cartridge change is desired. If a cartridge change is desired the microprocessor 23 performs the normal cartridge change routine discussed above in conjunction with FIGS. 5A and 5B. If a cartridge change is not desired the microprocessor 23 determines, at decision step 157, if a time and date reading are required. If a "yes" is entered the time and date are displayed at step 159. If a "no" is entered, or after the time and date have been displayed, the microprocessor 23 determines at decision step 155 if the mode control switch located behind the front panel of the recorder is set to "supervisor". If the switch is not in the proper position the routine is ended. If the switch is in the proper position the supervisor routine is begun.

At decision step 220 the operator is given the option of modifying the date and time information. If the operator chooses to modify the date and time information the data is entered at step 221 according to a predetermined format. Once the data has been entered, or if the operator chooses not to modify the time and date information, the operator is given the option of modifying the customer identification number at decision step 223. If the operator chooses to modify the customer identification number the data is entered at step 224 according to a predetermined format. After the data has been entered, or if the operator chooses not to modify the customer identification number, the operator is given the option of modifying the program constants at decision step 226. If the operator chooses to modify the program constants the modification count is incremented by the microprocessor 23 at step 228. The operator can then modify the following program constants:

the length of the demand interval at step 229, the counts per interval at step 230, the input channels utilized at step 231, the input channels having encoding registers at step 232, the memory code defining the required memory size at step 233, and the duration of a reportable loss of power outage at step 234. After the above data has been modified, or if the operator chooses not to modify the program constants, the microprocessor 23 proceeds to a decision step 236 shown in FIG. 7B.

At decision step 236 the operator has the option of receiving the total number of pulses for each channel. If the operator elects to receive this information the total pulse count for channel A is displayed by the microprocessor 23 as illustrated by step 237. The total pulse count is an eight digit number representative of the accumulation of pulses since the last cartridge change or last reset. After the operator has noted the pulse count he resets the pulse count at step 238. The microprocessor determines, at decision step 239, whether the pulse counts for all of the available channels have been displayed. The steps 237 and 238 are repeated until the pulse counts for all the available channels have been displayed. Once this is completed, or if the operator chooses not to display the total pulses, the operator then has the option of reading the registers as shown by the decision step 241. If the operator chooses to read the registers the microprocessor 23 will scan the encoding registers at step 243 and display the reading at step 244 for the operator to note. Decision step 245 will cause the steps 243 and 244 to be repeated until all of the registers have been read and displayed. After all of the registers have been read and displayed, or if the operator chooses not to read the registers, the operator has the option of instructing the microprocessor 23 to perform a self-test as illustrated by decision step 249. If the operator instructs the microprocessor 23 to perform the self-test the self-test will be run at step 250. The microprocessor 23 determines, at decision step 251, if the results of the self-test are satisfactory. If the results of the self-test prove unsatisfactory an error signal is displayed for the operator to note as shown by block 252. This concludes, with the exception of a few procedural steps, the description of the supervisor routine.

After the results of the self-test have been determined to be satisfactory or unsatisfactory, or if the operator chooses not to instruct the microprocessor 23 to perform the self-test, the operator has the option of rerunning the entire supervisor routine as shown by decision step 256. If the operator elects to rerun the supervisor routine the microprocessor 23 returns to the decision step 220 shown in FIG. 7A. If the operator elects not to rerun the supervisor routine the mode control switch is set to "normal" as shown by logic block 258. The microprocessor 23 verifies that the mode control switch has been set to "normal" at decision step 260. Once the microprocessor 23 has verified that the mode control switch is in the proper position the supervisor routine is ended. This concludes the description of FIGS. 7A and 7B.

Figure 8:
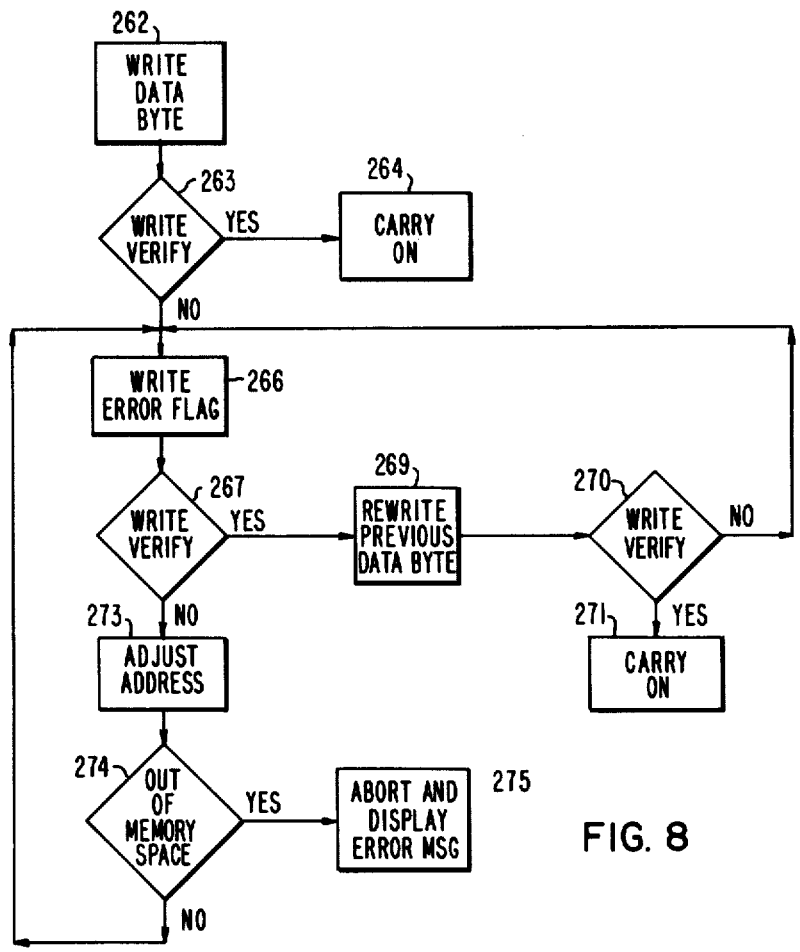
FIG. 8 is a logic block diagram illustrating a write error subroutine performed by the present invention upon the detection of a write error.

Turning to FIG. 8, a logic block diagram illustrating a write error subroutine performed by the present invention upon the detection of a write error is shown. The microprocessor 23 may be programmed to perform the write error subroutine whenever it is desirable to verify that data has been correctly written. The write error subroutine shown in FIG. 8 is considered to be an important feature of the present invention. A logic block 262 illustrates the writing of a data byte in the cartridge 49 by the microprocessor 23. The logic block 262 is intended to represent any of the plurality of write steps which may be performed by the microprocessor 23. The microprocessor 23 then determines at decision step 263 if the data byte has been correctly written. In the vast majority of cases the data byte is correctly written and the microprocesor 23 continues the routine which it was performing as illustrated by logic block 264.

If at decision step 263 the data byte was incorrectly written an error message flag is set in the microprocessor 23 and an error flag is written in the cartridge 49 at the next data word location. At this point, the possiblity exists that the error flag written in the data cartridge 47 has itself been incorrectly written. It is therefore necessary to perform a second write verify to determine if the error flag was correctly written as shown by decision step 267. If the error flag has been correctly written the microprocessor 23 then rewrites the data byte of step 262 at step 269. It is again possible to have an error in rewriting the data byte. It is therefore necessary to have a third write verify as shown by decision step 270. If the rewrite of the data byte is successful the microprocessor 23 returns to its normal operation as shown by step 271. If, however, the rewrite of the data byte has failed the microprocessor 23 returns to step 266 and writes an error flag.

As pointed out, it is possible at step 267 to have an error in writing the error flag. If this is the case, the microprocessor 23 will adjust the memory location of the data cartridge 49 at step 273. This adjustment will cause the microprocessor 23 to skip over a predetermined number of memory locations. After the address has been adjusted the microprocessor 23 determines, at decision step 274, if the memory locations of the cartridge 49 have been exhausted. If the memory locations of the cartridge 49 have been exhausted the microprocessor will abort further operations and display an error message as shown by step 275. If the cartridge 49 has additional memory locations available the microprocessor 23 will return to step 266 and attempt to write an error flag. In this manner, the microprocessor 23 verifies that both the data and any necessary error flags have been correctly written.

Figures 9, 10A:
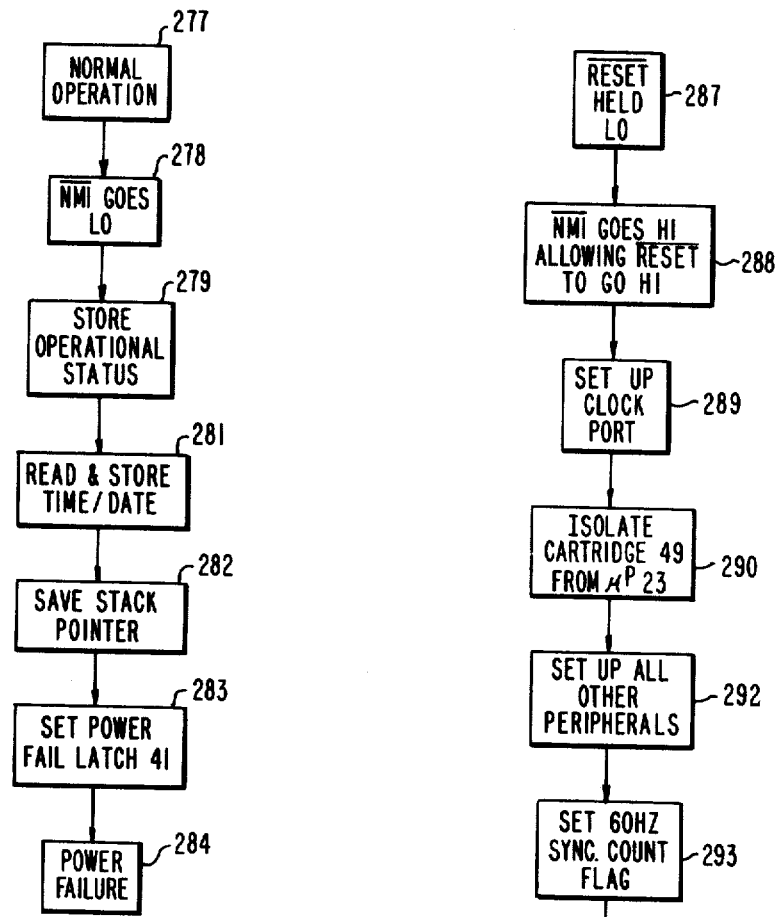
FIG. 9 is a logic block diagram illustrating a power failure sequence performed by the present invention upon receiving a non-maskable interrupt signal.
FIGS. 10A and 10B are logic block diagrams illustrating a power up sequence performed by the present invention after a power failure or during intitial startup.

FIGS. 9 and 10 are logic block diagrams illustrating a power failure sequence and a power up sequence, respectively, performed by the solid state event-logging system 14 disclosed herein. In FIG. 9, a logic block 277 represents the normal operation of the microprocessor 23. This normal operation may include any of the routines or subroutines discussed above in conjunction with FIGS. 3 through 8. When a power failure ooccurs, the microprocessor 23 receives the non-maskable interrupt signal $\overline{\text{NMI}}$ (which goes low) as shown by step 278. According to a predetermined hierarchy of signals, the non-maskable interrupt signal $\overline{\text{NMI}}$ receives top priority and causes the microprocessor to stop normal operations and perform the power failure routine. At step 279 the operational status of the microprocessor 23 is stored. The microprocessor 23 reads and stores the time and date information at step 281. A stack pointer is saved at step 282 and the power failure latch 41 is set at step 283. The microprocessor is then prepared for the ensuing power failure at step 284 when the power fails.

Figure 10B:
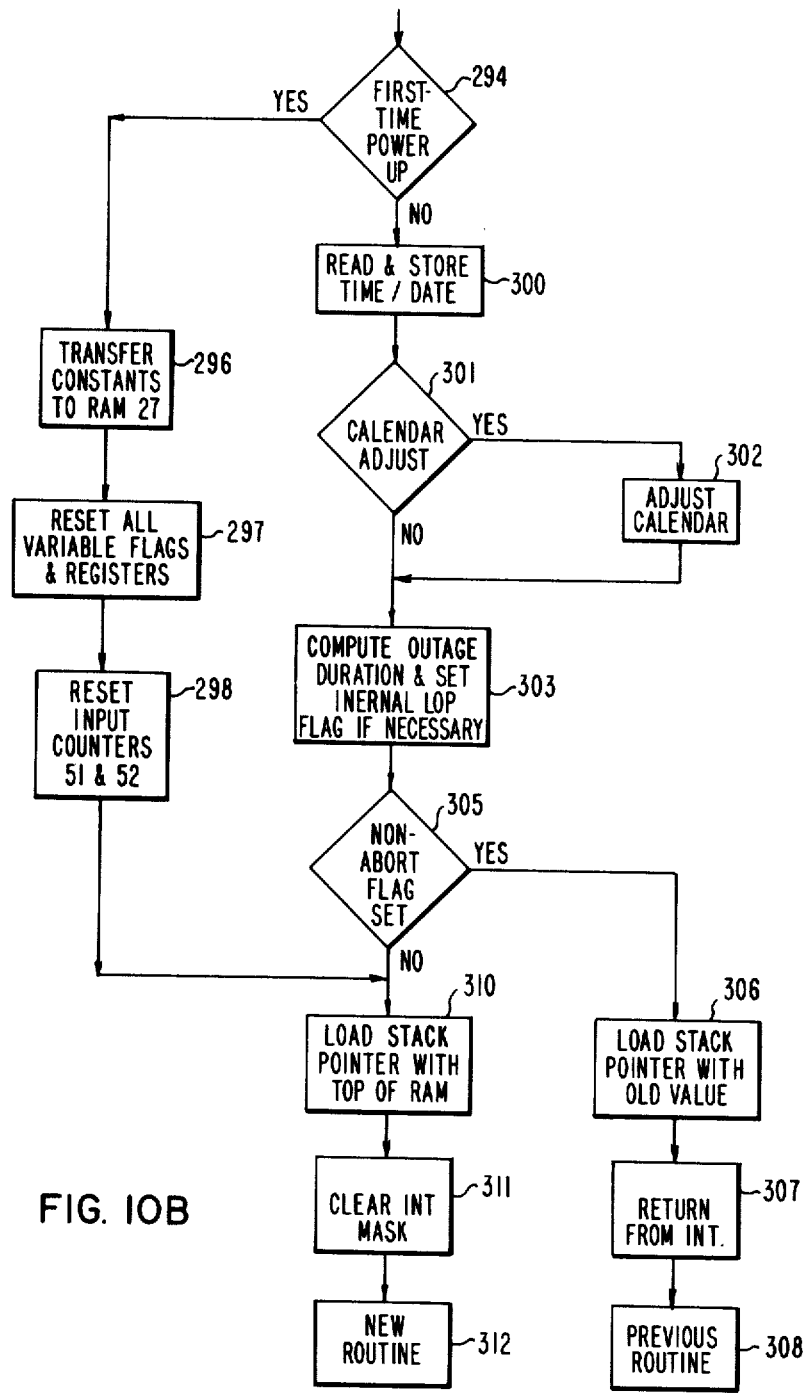

The power up routine performed by the present invention is shown in FIGS. 10A and 10B. At step 287 the reset signal $\overline{\text{RESET}}$ is held low causing a hardware reset of all the peripheral components. At step 288 the non-maskable interrupt signal $\overline{\text{NMI}}$ goes high allowing the reset signal $\overline{\text{RESET}}$ to go high. Once the microprocessor 23 has been reset at step 288, the microprocessor will set up the clock port at step 289, isolate the cartridge 49 from the microprocessor 23 (to prevent the microprocessor 23 from writing any data in the cartridge 49) by taking the voltage on the control line low at step 290, set up all the other peripheral components at step 292 and set the sixty hertz synchronization count flag at step 293. The microprocessor 23 determines, at decision step 294 in FIG. 10B, if this is a first time power up. A first time power up is encountered whenever the present invention is initially turned on or turned on after a period during which there was no back-up battery voltage available. The first time power up subroutine is illustrated by steps 296, 297 and 298. At step 296 the microprocessor 23 transfers constants from the ROM's 66 and 67 to the RAM 27. All of the variable flags and all of the registers are reset at step 297 and the input counters are reset at step 298. This concludes the description of the first time power up subroutine.

In the more normal course of events the microprocessor will determine, at decision step 294, that this is not a first time power up. In this case, the microprocessor 23 will read and store the time and date information at step 300. By comparing the time and date information produced at step 300 with the time and date information produced during the execution of the power failure routine the microprocessor determines, at step 301, if the calendar must be adjusted. If the adjustment of the calendar is necessary the microprocessor 23 takes appropriate action at step 302. After the calendar has been adjusted, or if no adjustment to the calendar is necessary, the duration of the power outage is calculated at step 303. If the duration of the power outage is longer than the minimum reportable power outage an internal loss of power flag is set.

After the computation at step 303, the microprocessor determines if a non-abort flag has been set at decision step 305. The non-abort flag is set by the operating program. If the non-abort flag is set this indicates that the program being executed during the power failure must be continued. In this event, the stack pointer is loaded with the old value at step 306 and an internal return from interrupt signal RTI is produced at step 307. The return from interrupt signal RTI causes the contents of the stack to be reloaded into the microprocessor 23. The microprocessor 23 then continues the execution of the previous routine as illustrated by step 308. If at decision step 305 the non-abort flag is not set the microprocessor 23 need not continue with the routine which was being executed at the time of the power failure. In this case, the stack pointer is loaded with the address of the top of the RAM 27 at step 310 and a clear interrupt mask signal CLI is produced at step 311. The clear interrupt mask signal CLI clears the interrupt mask within the microprocessor 23 such that the microprocessor can respond to future interrupt signals. The microprocessor then begins execution of a new routine as illustrated by logic block 312. This concludes the description of the Figures.

What we claim is:

1. An event-logging system for recording digital data from a plurality of electrical energy metering devices, comprising:

input counters for continuously counting the pulses of the digital data, said counters producing a plurality of running counts each representative of said data produced by one of the metering devices;

control means for producing a plurality of control signals;

means for sampling said running counts, said means producing sample values of each of said running counts in response to said control signals, each of said sample values being input to said control means wherein said sample value has the previous sample value subtracted therefrom, the difference from said subtraction added to an interval sum stored in said control means;

means for producing an interrupt signal composed of pulses responsive to the frequency of a line voltage, said interrupt signal input to said control means, said control means producing a clock interrogation signal responsive to said interrupt signal, said control means producing a synchronization count in response to said pulses of said interrupt signal;

clock means producing real time information, said real time information input to said control means in response to said clock interrogation signal, said synchronization count compared by said control means to a predetermined value at preselected times, said clock means being reset by said control signals in response to said comparison such that said clock means is kept in synchronization with said line voltage;

a cartridge comprising removable solid state memory means; and output interface means, said means inputting said real time information and said interval sums to said removable memory means according to a predetermined format in response to said control signals, said control means resetting said interval sums to zero upon the recording in said removable memory means of said interval sums.

2. The system of claim 1 wherein the system continues to function when the removable solid state memory means is removed.

3. The system of claim 1 wherein the removable solid state memory means is turned on and off by the control means.

4. The system of claim 1 including an input interface for both receiving the digital data and protecting the input counters from electrical surges.

5. The system of claim 1 wherein the input counters include four, four-bit counters.

6. The system of claim 1 wherein said system is powered by a primary voltage comprising an external source voltage and wherein the control means includes a microprocessor, a read only memory containing preprogrammed information, a random access memory, and a bus interconnecting said aforementioned elements.

7. The system of claim 6 including means for providing a backup voltage for said primary voltage, said backup voltage input to the random access memory.

8. The system of claim 6 wherein the preprogrammed information includes instructions for the microprocessor and includes typical values for program variables.

9. The system of claim 6 including a power supply producing a supply voltage, and including a reset circuit, said circuit producing a reset signal for resetting the microprocessor, said reset signal responsive to the leading edge of said supply voltage.

10. The system of claim 9 including a power outage detection circuit, said circuit monitoring said power supply and producing a power failure signal, and including a transmission gate connecting the microprocessor to the random access memory, said gate responsive to said power failure signal such that said random access memory is disconnected from said microprocessor in the event of a power failure.

11. The system of claim 9 including a comparator responsive to both the supply voltage and a fixed reference voltage, the reset circuit produces the reset signal in response to said comparison such that the microprocessor is reset when the supply voltage sags.

12. The system of claim 1 wherein the sample values are produced faster than the input counters can roll over by continuous counting.

13. The system of claim 1 wherein the means producing the interrupt signal includes a divide by sixty counter responsive to the frequency of a sixty hertz line voltage.

14. The system of claim 1 wherein the real time information includes the month, day of month, hours, minutes and seconds.

15. The system of claim 14 wherein one of the pulses of the interrupt signal is produced every second.

16. The system of claim 15 wherein the synchronization count has an initial value of sixty, and wherein the control means decrements said count in response to the pulses of the interrupt signal, and wherein the control means compares said count to a value of zero once each hour, said control means resetting the clock means in response to said comparison.

17. The system of claim 14 wherein the control means contains preprogrammed information, and wherein the real time information is compared by the control means to said preprogrammed information, said control means updating the month and day of month information in response to said comparison.

18. The system of claim 1 wherein the removable solid state memory means includes a cartridge containing a solid state memory.

19. The system of claim 18 wherein the solid state memory includes an ultra-violet, erasable, programmable, read only memory.

20. The system of claim 18 wherein the solid state memory includes an electrically erasable, read only memory.

21. The system of claim 18 wherein the solid state memory includes a random access memory.

22. The system of claim 18 wherein the solid state memory includes a bubble memory.

23. The system of claim 1 including an input/output interface for automatically receiving meter readings from the metering devices, said readings being input to the removable memory means according to a predetermined format.

24. The system of claim 1 wherein the control means contains preprogrammed information, and including an input interface for receiving instructions for modifying said preprogrammed information.

25. The system of claim 1 wherein the control means contains preprogrammed information including a write error subroutine instructing said control means to read preselected data which said control means has written, said control means writting an error flag when said data is incorrectly written.

26. The system of claim 25 wherein the write error subroutine includes instructing the control means to read the error flag, said control means rewriting the data when said error flag is correctly written, said control means adjusting an address location and rewriting said error flag when said first error flag is incorrectly written.

27. The system of claim 26 wherein the write error subroutine includes instructing the control means to read the rewritten data, said control means writing an error flag when said written data is incorrectly written.

28. The system of claim 1 including output means producing output signals representative of the status of the control means.

29. The system of claim 1 wherein the control means contains preprogrammed information including instructions for both a normal cartridge change procedure and a manual cartridge change procedure.

30. The system of claim 29 wherein the instructions for both the normal cartridge change and the manual cartridge change includes the performance of diagnostic tests on said cartridge.

31. The system of claim 30 wherein the diagnostic tests include a test for erasures to determine if the cartridge is fresh.

32. The system of claim 30 wherein the diagnostic tests include a test for capacity to determine if the cartridge has sufficient capacity for its intended use.

33. The system of claim 30 wherein the diagnostic tests include a write/read test to determine if the cartridge is functional.

34. The system of claim 1 wherein said system is powered by a primary voltage comprising an external source voltage and including means for providing a backup voltage for said primary voltage, said backup voltage input to the clock means.

35. The system of claim 34 wherein the control means contains preprogrammed information including a primary voltage power failure sequence instructing said control means to prepare for a power failure.

36. The system of claim 35 wherein the power failure sequence includes instructing the control means to store the current real time information.

37. The system of claim 36 wherein the preprogrammed information includes a power up sequence instructing the control means to prepare for normal operation.

38. The system of claim 37 wherein the power up sequence includes instructing the control means to store the current real time information, calculate the difference between the real time information stored during the power failure sequence and said real time information stored during said power up sequence, and to store the result of said calculation.

39. The system of claim 1 wherein the format includes a header record recorded at the beginning of the removable memory means, and includes a data record, and includes a trailer record recorded at the end of said removable memory means.

40. The system of claim 39 wherein the header record includes a write/read test, preprogrammed information, the real time information, and data representative of the meter readings of the electrical energy metering devices.

41. The system of claim 40 wherein the header record includes operator entered real time information input for comparison with the real time information produced by the clock means.

42. The system of claim 39 wherein the data record includes the interval sums and loss of power information.

43. The system of claim 39 wherein the trailer record includes preprogrammed information, the real time information, and data representative of the meter readings of the electrical energy metering devices.

44. The system of claim 43 wherein the trailer record includes operator entered real time information input for comparison with the real time information produced by the clock means.

45. The system of claim 43 wherein the trailer record includes diagnostic information about said system.

46. The system of claim 45 wherein the control means includes a microprocessor, a read only memory, a random access memory, and a bus interconnecting said aforementioned elements, and wherein the diagnostic information includes a read only memory checksum.

47. The system of claim 45 wherein the diagnostic information includes a random access memory checksum.

48. The system of claim 45 including a battery for supplying a backup voltage and wherein the diagnostic information includes a battery test.

49. An event-logging system for recording digital data from a plurality of electrical energy metering devices, said system powered by a primary voltage source and comprising:

input counters for continuously counting the pulses of the digital data, said counters producing a plurality of running counts each representative of said data produced by one of the metering devices;

a microprocessor for producing a plurality of control signals;

a read only memory for containing preprogrammed information;

a random access memory, said microprocessor transferring a portion of said preprogrammed information from said read only memory to said random access memory;

means for sampling said running count, said means producing sample values of each of said running counts in response to said control signals, each of said sample values input to said microprocessor wherein said sample value has the previous sample value subtracted therefrom, the difference from said subtraction added to an interval sum stored in said random access memory;

means producing an interrupt signal composed of pulses corresponding to the frequency of a sixty hertz line voltage, said interrupt signal input to said microprocessor, said microprocessor producing a clock interrogation signal responsive to said interrupt signal, said microprocessor producing a synchronization count responsive to the pulses of said interrupt signal;

clock means producing real time information, said real time information stored in said random access memory in response to said clock interrogation signal, said synchronization count compared by said microprocessor to a predetermined value at preselected times, said clock means being reset by said control signals in response to said comparison such that said clock means is kept in synchronization with said line voltage;

removable memory means;

output interface means receiving a stream of data from said random access memory and inputting said stream of data to said removable memory means according to a predetermined format in response to said control signals, said stream of data including said real time information, a portion of said preprogrammed information and said interval sums, said microprocessor resetting said interval sums to zero upon said stream of data being correctly recorded in said removable memory means;

a power outage detection circuit responsive to failure of the primary voltage source for producing a power failure signal; and a transmission gate selectively connecting said random access memory and said microprocessor in response to said power failure signal.

50. The system of claim 49 wherein the means for sampling includes a buffer responsive to the input counters and includes a latch responsive to said buffer.

51. The system of claim 49 including a power supply producing a supply voltage, and including a reset circuit, said circuit producing a reset signal for resetting the microprocessor, said reset signal responsive to the leading edge of said supply voltage.

52. The system of claim 51 including a comparator responsive to both the supply voltage and a fixed reference voltage such that the reset circuit produces the reset signal in response to said comparison.

* * * * *